US012579058B2

(12) United States Patent
Lee et al.

(10) Patent No.: US 12,579,058 B2
(45) Date of Patent: Mar. 17, 2026

(54) MEMORY DEVICE, MEMORY SYSTEM INCLUDING MEMORY DEVICE, AND OPERATING METHOD OF MEMORY DEVICE

(71) Applicant: SAMSUNG ELECTRONICS CO., LTD., Suwon-si (KR)

(72) Inventors: Junha Lee, Suwon-si (KR); Kyoungtae Kang, Suwon-si (KR); Hyunsuk Kang, Suwon-si (KR); Dongho Shin, Suwon-si (KR); Kang Yoon Lee, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/946,517

(22) Filed: Nov. 13, 2024

(65) Prior Publication Data

US 2025/0156310 A1 May 15, 2025

(30) Foreign Application Priority Data

Nov. 14, 2023 (KR) ........................ 10-2023-0157253

(51) Int. Cl.
*G06F 12/02* (2006.01)
*G06F 13/40* (2006.01)

(52) U.S. Cl.
CPC ...... *G06F 12/0223* (2013.01); *G06F 13/4086* (2013.01); *G06F 2213/16* (2013.01)

(58) Field of Classification Search
None
See application file for complete search history.

(56) References Cited

U.S. PATENT DOCUMENTS

| 7,773,440 B2 | 8/2010 | Kim et al. |
| 8,598,889 B2 | 12/2013 | Cho |
| 8,953,409 B2 | 2/2015 | Ishikawa |
| 9,461,647 B2 | 10/2016 | Chung et al. |
| 9,766,831 B2 | 9/2017 | Gans |

(Continued)

FOREIGN PATENT DOCUMENTS

| CN | 110073439 B | * | 3/2023 |
| JP | 2011-187115 A | | 9/2011 |

(Continued)

*Primary Examiner* — Brian R Peugh
(74) *Attorney, Agent, or Firm* — Sughrue Mion, PLLC

(57) ABSTRACT

A memory device includes data pads that are connected to an external memory controller, a ZQ pad that is connected to an external resistor, data drivers and receivers that are connected to the data pads and output first data signals to the data pads or receive second data signals from the data pads, and a ZQ calibrator that is connected to the ZQ pad. The memory device performs ZQ calibration based on a voltage of the ZQ pad, generates ZQ codes as a result of the ZQ calibration, and provides the ZQ codes to the data drivers and receivers. The ZQ calibrator performs a first-type ZQ calibration in response to a command received from the external memory controller and performs a second-type ZQ calibration without the command being received from the external memory controller.

20 Claims, 16 Drawing Sheets

(56)                    References Cited

U.S. PATENT DOCUMENTS

|  |  |  |  |
|---|---|---|---|
| 9,886,378 | B2 | 2/2018 | Leem |
| 9,935,632 | B1 | 4/2018 | Gans |
| 10,026,457 | B2 | 7/2018 | Arai et al. |
| 10,192,607 | B2 | 1/2019 | Wang |
| 10,193,711 | B2 | 1/2019 | Wieduwilt et al. |
| 10,348,270 | B2 | 7/2019 | Gans |
| 10,504,571 | B1 | 12/2019 | Johnson et al. |
| 10,643,675 | B2 | 5/2020 | Heo et al. |
| 11,495,280 | B2 | 11/2022 | Seo et al. |
| 11,574,673 | B2 | 2/2023 | Jung et al. |
| 2020/0111516 | A1 | 4/2020 | Johnson et al. |
| 2023/0066632 | A1 | 3/2023 | Lee et al. |
| 2023/0110208 | A1 | 4/2023 | Lee et al. |

FOREIGN PATENT DOCUMENTS

|  |  |  |  |
|---|---|---|---|
| JP | 2015-219936 | A | 12/2015 |
| KR | 10-2008-0082230 | A | 9/2008 |
| KR | 10-1069733 | B1 | 10/2011 |
| KR | 10-2015-0124751 | A | 11/2015 |
| KR | 10-2019-0099933 | A | 8/2019 |
| KR | 10-2022-0005813 | A | 1/2022 |
| KR | 10-2365520 | B1 | 2/2022 |
| KR | 10-2022-0070643 | A | 5/2022 |

* cited by examiner

FIG. 1

MEMORY DEVICE, MEMORY SYSTEM INCLUDING MEMORY DEVICE, AND OPERATING METHOD OF MEMORY DEVICE

CROSS-REFERENCE TO RELATED APPLICATIONS

This application claims priority under 35 U.S.C. § 119 to Korean Patent Application No. 10-2023-0157253 filed on Nov. 14, 2023, in the Korean Intellectual Property Office, the disclosure of which is incorporated by reference herein in its entirety.

BACKGROUND

The present disclosure relates to an electronic device, and more particularly, relate to a memory device performing ZQ calibration, a memory system including the memory device, and an operating method of the memory device.

A memory device may be manufactured by using a semiconductor. The memory device may be used to store data. To use the memory device, that is, to store data in the memory device or to read data from the memory device, the memory device may be connected to a memory controller. The memory controller may communicate with the memory device based on various standards.

As the number of versions of standards defining the communication between the memory device and the memory controller increase, a communication frequency between the memory device and the memory controller may become higher. The high communication frequency may cause an increase in the probability that an error occurs during the communication between the memory device and the memory controller. Various techniques are being developed to prevent an error from occurring during the communication between the memory device and the memory controller.

ZQ calibration may be performed in response to the memory controller transmitting a command to the memory device. The memory controller is incapable of accessing the memory device during a time taken for the memory controller to transmit a command, a time taken for the memory device to perform ZQ calibration, and a time taken to check a result of the ZQ calibration. This reduces the efficiency of the bus between the memory controller and the memory device.

SUMMARY

Embodiments of the present disclosure provide a memory device which may have improved operating speed and improved reliability, a memory system including the memory device, and an operating method of the memory device.

According to an aspect of an embodiment, a memory device includes data pads configured to be connected to an external memory controller; a ZQ pad configured to be connected to an external resistor; data drivers and receivers connected to the data pads, and configured to output first data signals to the data pads or to receive second data signals from the data pads; and a ZQ calibrator connected to the ZQ pad, and configured to perform ZQ calibration based on a voltage of the ZQ pad, to generate ZQ codes as a result of the ZQ calibration, and to provide the ZQ codes to the data drivers and receivers, wherein the ZQ calibrator is configured to perform a first-type ZQ calibration in response to a command received from the external memory controller; and perform a second-type ZQ calibration without the command being received from the external memory controller.

According to an aspect of an embodiment, a memory system includes a plurality of memory devices; and a memory controller configured to control the plurality of memory devices, wherein each of the plurality of memory devices is configured to perform a first-type ZQ calibration in response to a command of the memory controller; and perform a second-type ZQ calibration without the command of the memory controller, each of the plurality of memory devices comprises drivers configured to transmit data signals to the memory controller, and the first-type ZQ calibration and the second-type ZQ calibration are configured to calibrate the drivers of each of the plurality of memory devices.

According to an aspect of an embodiment, an operating method of a memory device, includes: receiving, at the memory device, a command from an external memory controller; performing, at the memory device, a first-type ZQ calibration in response to the command; and performing, at the memory device, a second-type ZQ calibration in response to an internally managed count reaching a threshold value and without receiving the command from the external memory controller, wherein the first-type ZQ calibration and the second-type ZQ calibration are performed to calibrate drivers of the memory device, wherein the drivers are configured to transmit data signals to the external memory controller.

BRIEF DESCRIPTION OF THE DRAWINGS

The above and other aspects and features of the present disclosure will become apparent by describing in detail embodiments thereof with reference to the accompanying drawings, in which:

FIG. 1 illustrates a memory system according to an embodiment of the present disclosure;

DETAILED DESCRIPTION

Figure 2:
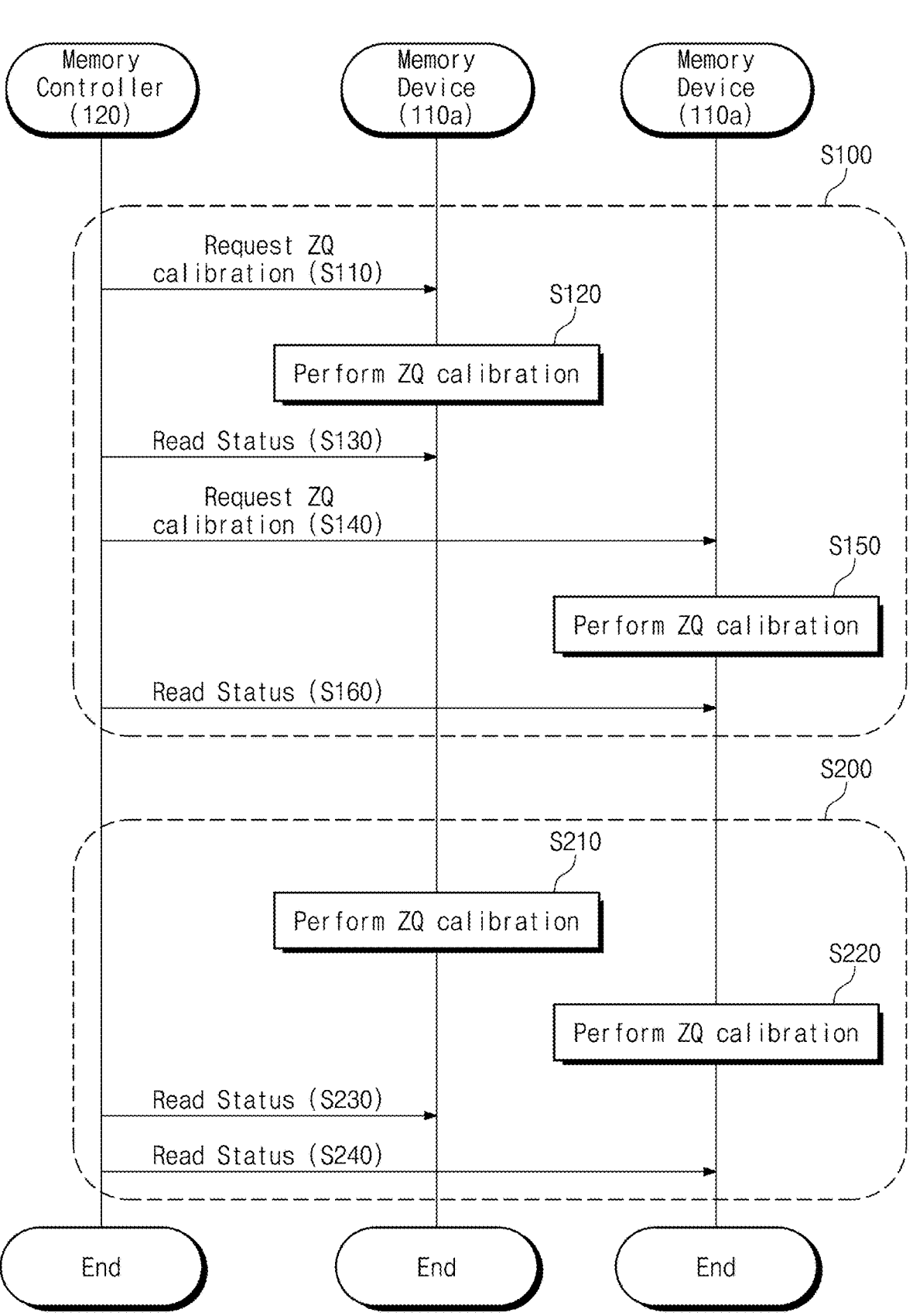
FIG. 2 illustrates an operating method of a memory system.

Below, embodiments of the present disclosure will be described in detail and clearly to such an extent that an ordinary one in the art easily carries out the present disclosure.

Figure 1:
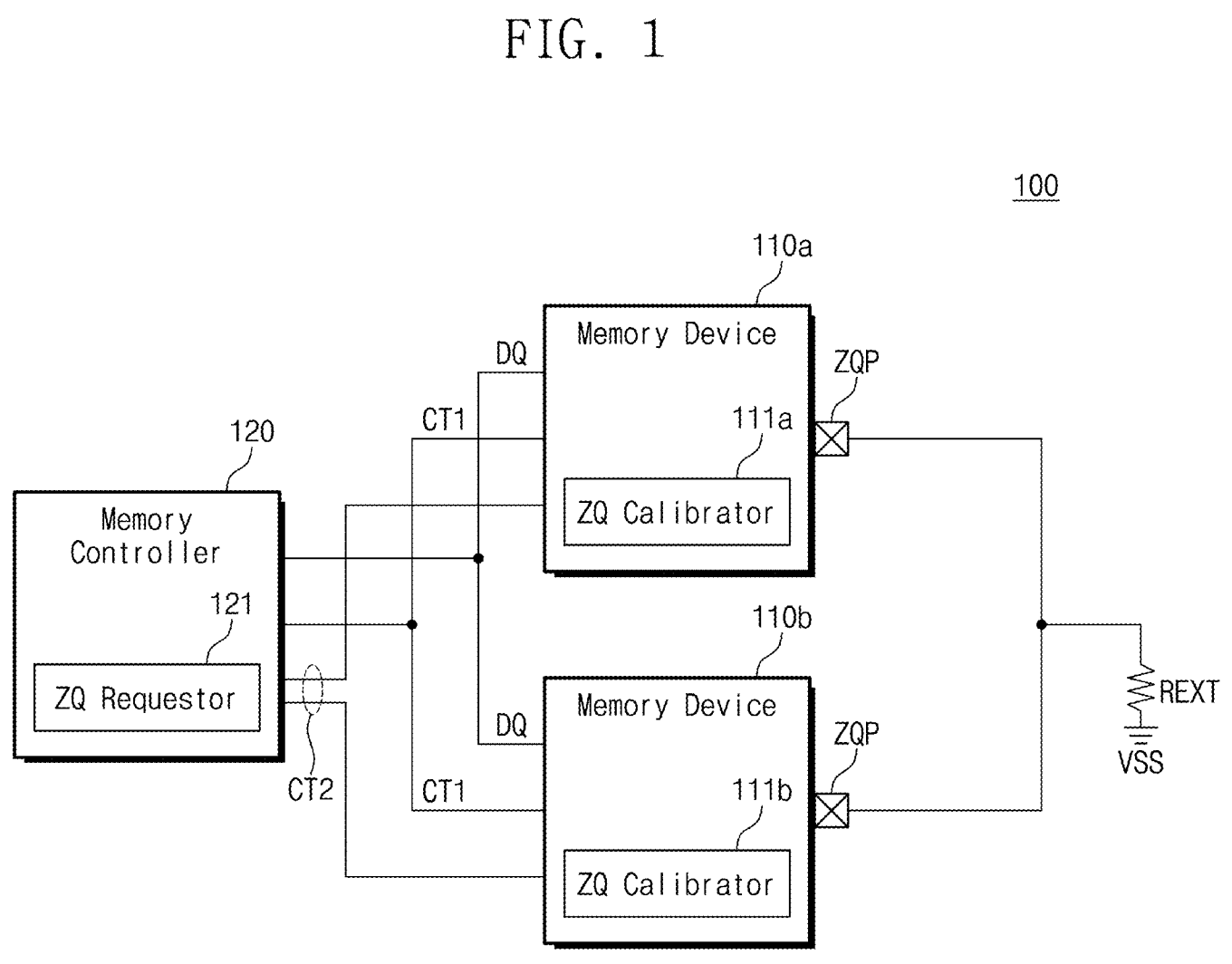

FIG. 1 illustrates a memory system 100 according to an embodiment of the present disclosure. Referring to FIG. 1, the memory system 100 may include a first memory device 110*a*, a second memory device 110*b*, a memory controller 120, and an external resistor REXT.

The first memory device 110*a* and the second memory device 110*b* may perform the communication of data signals DQ with the memory controller 120 through common lines (or wires). For example, each of the first memory device 110*a* and the second memory device 110*b* may include data pads configured to communicate the data signals DQ. For example, the data signals DQ may include a command, an address, and data. That is, the first memory device 110*a* and the second memory device 110*b* may perform the communication of the command, the address, and the data with the memory controller 120 through the common lines.

The first memory device 110*a* and the second memory device 110*b* may perform the communication of first control signals CT1 with the memory controller 120 through the common lines. For example, each of the first memory device 110*a* and the second memory device 110*b* may include first control pads configured to communicate the first control signals CT1.

The first memory device 110*a* and the second memory device 110*b* may perform the communication of second control signals CT2 with the memory controller 120 through independent lines. For example, each of the first memory device 110*a* and the second memory device 110*b* may include second control pads configured to communicate the second control signals CT2. In an embodiment, the second control signals CT2 may include signals for enabling the first memory device 110*a* and the second memory device 110*b*, respectively. The second control signals CT2 may include a signal for notifying the status of each of the first memory device 110*a* and the second memory device 110*b*, for example, a ready state or a busy state of each of the first memory device 110*a* and the second memory device 110*b*.

The first memory device 110*a* and the second memory device 110*b* may be implemented with the same configuration and may operate in the same method. The first memory device 110*a* may include a ZQ pad ZQP and a ZQ calibrator 111*a*, and the second memory device 110*b* may include a ZQ pad ZQP and a ZQ calibrator 111*b*.

The ZQ pad ZQP of the first memory device 110*a* and the ZQ pad ZQP of the second memory device 110*b* may be connected in common to the external resistor REXT. The external resistor REXT may be connected to a ground node to which a ground voltage VSS is applied. The ZQ calibrator 111*a* or 111*b* may perform ZQ calibration by using the external resistor REXT. The ZQ calibration may include detecting codes for calibrating drivers of the first memory device 110*a* and the second memory device 110*b*, which are used to transmit the data signals DQ to the memory controller 120 through the common lines. The ZQ calibrator 111*a* may detect codes indicating a driving intensity for pulling up the data signals DQ and a driving strength for pulling down the data signals DQ.

The memory controller 120 may include a ZQ requestor 121. Depending on an internal calibration policy, the ZQ requestor 121 may transmit commands for requesting the first memory device 110*a* and the second memory device 110*b* to perform the ZQ calibration, to the first memory device 110*a* and the second memory device 110*b*, respectively. For example, the calibration policy may be set by an external host device or may be set in the process of manufacturing the memory controller 120. The memory controller 120 may be configured to adaptively adjust the calibration policy.

In an embodiment, each of the first memory device 110*a* and the second memory device 110*b* may be implemented with a nonvolatile memory device such as a flash memory device, a phase-change memory device, a magnetic memory device, a ferroelectric memory device, or a resistive memory device. The memory system 100 may be implemented with a storage device which retains data even when a power is turned off. The memory system 100 may be implemented with a solid state drive, a storage module capable of being attached or removed to or from a rack, an embedded chip capable of being mounted on a substrate, etc.

In an embodiment, the first memory device 110*a* and the second memory device 110*b* may be implemented with one semiconductor package, for example, a multi-die package. As another example, the first memory device 110*a* and the second memory device 110*b* may be implemented with different semiconductor packages. The external resistor REXT may be formed in the substrate on which the semiconductor package(s) is mounted.

FIG. 2 illustrates an operating method of the memory system 100. Referring to FIGS. 1 and 2, operation S100 shows an example in which the first memory device 110*a* and the second memory device 110*b* perform first-type ZQ calibration. The first-type ZQ calibration of operation S100 may be performed through operation S110 to operation S160.

In operation S110, the memory controller 120 may request the ZQ calibration from the first memory device 110*a*. For example, the memory controller 120 may transmit a command for requesting the ZQ calibration to the first memory device 110*a*. For example, when an internal calibration policy is satisfied, the memory controller 120 may request the ZQ calibration from the first memory device 110*a*. The internal calibration policy may include that there is satisfied at least one condition of the following: 1) a condition where a specific time period passes, 2) a condition where the memory controller 120 transmits a specific command (e.g., at least one of write, read, erase, precharge, and refresh commands) to the first memory device 110*a* or the second memory device 110*b* as much as the specific number of times, 3) a condition where a temperature is higher or lower than a specific temperature, and 4) a condition where a specific time period passes in a state where a temperature is higher or lower than a specific temperature.

In operation S120, the first memory device 110*a* may perform the first-type ZQ calibration. For example, the first memory device 110*a* may generate ZQ codes by using the external resistor REXT connected to the ZQ pad ZQP. The first memory device 110*a* may perform the ZQ calibration by applying the ZQ codes to drivers for transmitting the data signals DQ to the memory controller 120.

In operation S130, the memory controller 120 may read status. For example, the memory controller 120 may transmit, to the first memory device 110*a*, a status read command for requesting the first memory device 110a to perform a status read operation. In response to the status read command, the first memory device 110a may transmit, for example, status information stored in a status register to the memory controller 120. The status information may include information indicating whether the ZQ calibration succeeds or fails. For example, when the ZQ calibration succeeds, information associated with the ZQ calibration from among the status information may maintain an initial value or a default value. When the information associated with the ZQ calibration from among the status information has the initial value or the default value, the ZQ calibration of the first memory device 110a may be completed.

When the ZQ calibration fails, the first memory device 110a may record a pattern (e.g., a pattern defined by a manufacturer (or a vendor)), which indicates that the ZQ calibration fails, at the status register. That is, the status information which the first memory device 110a transmits to the memory controller 120 may include the pattern indicating that the ZQ calibration fails. When the pattern indicating the failure of the ZQ calibration is received, the memory controller 120 may again request the ZQ calibration from the first memory device 110a.

In operation S140, the memory controller 120 may request the ZQ calibration from the second memory device 110b. For example, the memory controller 120 may transmit the command for requesting the ZQ calibration to the second memory device 110b. For example, when the internal calibration policy is satisfied, the memory controller 120 may request the ZQ calibration from the second memory device 110b. For example, when the internal calibration policy is satisfied, the memory controller 120 may consecutively request the ZQ calibration of the first memory device 110a and the ZQ calibration of the second memory device 110b.

In operation S150, the second memory device 110b may perform the first-type ZQ calibration. For example, the second memory device 110b may generate ZQ codes by using the external resistor REXT connected to the ZQ pad ZQP. The second memory device 110b may perform the ZQ calibration by applying the ZQ codes to drivers for transmitting the data signals DQ to the memory controller 120.

In operation S160, the memory controller 120 may read status. For example, the memory controller 120 may transmit, to the second memory device 110b, the status read command for requesting the second memory device 110b to perform the status read operation. In response to the status read command, the second memory device 110b may transmit, for example, status information stored in a status register to the memory controller 120. The status information may include information indicating whether the ZQ calibration succeeds or fails. For example, when the ZQ calibration succeeds, information associated with the ZQ calibration from among the status information may maintain an initial value or a default value. When the information associated with the ZQ calibration from among the status information has the initial value or the default value, the ZQ calibration of the second memory device 110b may be completed. When the pattern indicating the failure of the ZQ calibration is received, the memory controller 120 may again request the ZQ calibration from the second memory device 110b.

As described above, the first memory device 110a and the second memory device 110b may independently perform the first-type ZQ calibration in response to the requests of the memory controller 120. For example, the first-type ZQ calibration may be performed in two schemes. For example, in the initialization of the memory system 100, in response to the requests of the memory controller 120, the first memory device 110a and the second memory device 110b may perform first-type long ZQ calibration. While the memory system 100 operates after the initialization of the memory system 100, in response to the requests of the memory controller 120, the first memory device 110a and the second memory device 110b may perform first-type short ZQ calibration.

Operation S200 shows an example in which the first memory device 110a and the second memory device 110b perform second-type ZQ calibration. The second-type ZQ calibration of operation S200 may be performed through operation S210 to operation S240.

In operation S210, the first memory device 110a may perform the second-type ZQ calibration. For example, without the request of the memory controller 120, in response to that a calibration policy of the first memory device 110a is satisfied, the first memory device 110a may perform the second-type ZQ calibration.

For example, that the calibration policy of the first memory device 110a is satisfied may include that there is satisfied at least one condition of the following: 1) a condition where a specific time period passes, 2) a condition where the memory controller 120 transmits a specific command (e.g., at least one of write, read, erase, precharge, and refresh commands) to the first memory device 110a or the second memory device 110b as much as the specific number of times, 3) a condition where a temperature is higher or lower than a specific temperature, and 4) a condition where a specific time period passes in a state where a temperature is higher or lower than a specific temperature.

In operation S220, the second memory device 110b may perform the second-type ZQ calibration. For example, without the request of the memory controller 120, in response to that the calibration policy of the second memory device 110b is satisfied, the second memory device 110b may perform the second-type ZQ calibration.

For example, the calibration policy of the first memory device 110a and the calibration policy of the second memory device 110b may be managed independently of each other. Even though the calibration policy of one of the first memory device 110a and the second memory device 110b is satisfied, the calibration policy of the other thereof may not be satisfied. Also, the calibration policy of the first memory device 110a and the calibration policy of the second memory device 110b may be simultaneously satisfied.

In an embodiment, the second-type ZQ calibration may be performed to be similar to the first-type short ZQ calibration. The first-type short ZQ calibration may be initiated in response to the request of the memory controller 120; in contrast, the second-type ZQ calibration may be initiated by the first memory device 110a or the second memory device 110b without the request of the memory controller 120.

After the first memory device 110a and the second memory device 110b perform the second-type ZQ calibration, the first memory device 110a and the second memory device 110b may not transmit information indicating that the second-type ZQ calibration is performed to the memory controller 120 or may omit the transmission of the information.

In operation S230, the memory controller 120 may read status of the first memory device 110a. For example, the memory controller 120 may read the status information of the first memory device 110a at an arbitrary point in time not associated with the second-type ZQ calibration, at a necessary point in time, or after the transmission of a specific command to the first memory device 110a. As the memory controller 120 reads the status information of the first memory device 110a, the memory controller 120 may determine whether the second-type ZQ calibration of the first memory device 110a succeeds or fails.

In operation S240, the memory controller 120 may read status of the second memory device 110b. For example, the memory controller 120 may read the status information of the second memory device 110b at an arbitrary point in time not associated with the second-type ZQ calibration, at a necessary point in time, or after the transmission of a specific command to the second memory device 110b. As the memory controller 120 reads the status information of the second memory device 110b, the memory controller 120 may determine whether the second-type ZQ calibration of the second memory device 110b succeeds or fails.

In an embodiment, the memory controller 120 may independently perform the operation of reading the status information (or determining the status) of the first memory device 110a and the operation of reading the status information (or determining the status) of the second memory device 110b.

In an embodiment, the first memory device 110a and the second memory device 110b may operate a non-deterministic scheme. For example, the first memory device 110a and the second memory device 110b may not be configured to complete an operation requested by the memory controller 120 within a given time.

The first memory device 110a or the second memory device 110b may transmit, to the memory controller 120, a signal indicating the busy state while executing the command of the memory controller 120. After the operation corresponding to the command of the memory controller 120 is completed, the first memory device 110a or the second memory device 110b may transmit a signal indicating the ready state to the memory controller 120. While the first memory device 110a or the second memory device 110b is in the ready state, the memory controller 120 may transmit a command, an address, or data to the first memory device 110a or the second memory device 110b as the data signals DQ.

In an embodiment, while the first memory device 110a or the second memory device 110b performs the second-type ZQ calibration, the first memory device 110a or the second memory device 110b may transmit the signal indicating the busy state to the memory controller 120. That is, while the first memory device 110a or the second memory device 110b performs the second-type ZQ calibration, in response to the signal indicating the busy state, the memory controller 120 may identify that the first memory device 110a or the second memory device 110b is incapable of receiving a command, an address, or data. In response to the signal indicating the busy state, the memory controller 120 may wait the transmission of the command, address, or data to the first memory device 110a or the second memory device 110b, and thus, an abnormal operation may be prevented from being performed in the second-type ZQ calibration of the first memory device 110a or the second memory device 110b.

As described above, the first memory device 110a or the second memory device 110b may perform the first-type ZQ calibration in response to the request of the memory controller 120. The first memory device 110a or the second memory device 110b may perform the second-type ZQ calibration without the request of the memory controller 120. The second-type ZQ calibration may be completed within a time shorter than the first-type ZQ calibration. As the first memory device 110a or the second memory device 110b repeatedly performs the second-type ZQ calibration, the memory system 100 may reduce a length of a time, during which the communication between the memory controller 120 and the first memory device 110a or the second memory device 110b is suspended due to the ZQ calibration, while improving the reliability through the ZQ calibration. That is, based on the second-type ZQ calibration, the reliability of the memory system 100 may be improved, and an operating speed may be improved.

Figure 3:
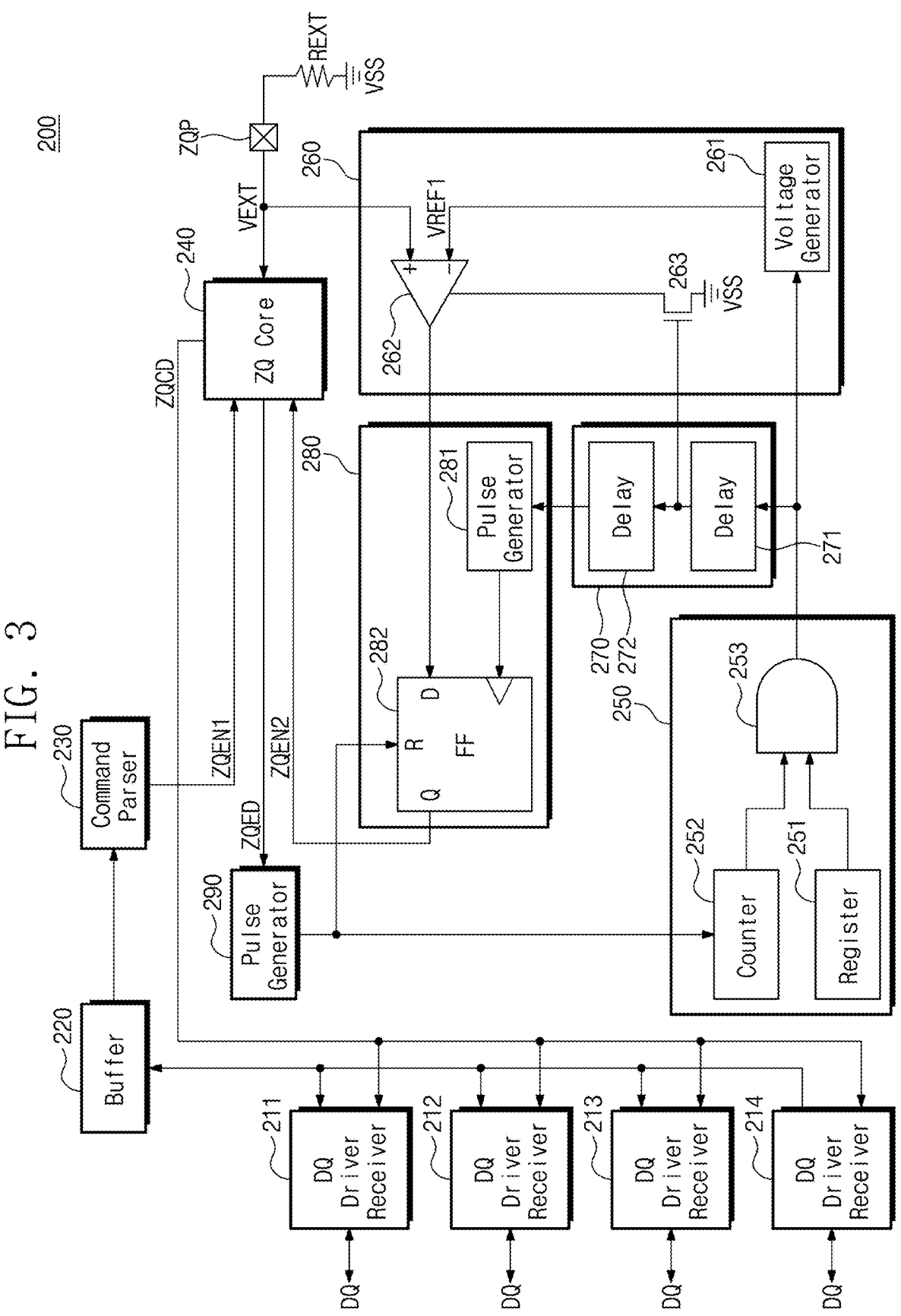
FIG. 3 illustrates an example of components associated with ZQ calibration from among components of a first memory device or a second memory device.

FIG. 3 illustrates an example of components associated with ZQ calibration from among components of the first memory device 110a or the second memory device 110b. Referring to FIGS. 1 and 3, a memory device 200 may include components associated with the ZQ calibration from among components of the first memory device 110a or the second memory device 110b. For example, ZQ calibrator 11a of FIG. 1, in some embodiments, is implemented by the circuits of FIG. 3.

For example, the memory device 200 may include a first data signal driver and receiver 211, a second data signal driver and receiver 212, a third data signal driver and receiver 213, a fourth data signal driver and receiver 214, a buffer 220, a command parser 230, a ZQ core 240, a ZQ initiator 250, a collision preventer 260, a delay chain 270, a ZQ commander 280, and a pulse generator 290.

The first data signal driver and receiver 211, the second data signal driver and receiver 212, the third data signal driver and receiver 213, and the fourth data signal driver and receiver 214 may perform the communication of the data signals DQ with the memory controller 120. The first data signal driver and receiver 211, the second data signal driver and receiver 212, the third data signal driver and receiver 213, and the fourth data signal driver and receiver 214 may communicate the data signals DQ through data pads.

Each of the first data signal driver and receiver 211, the second data signal driver and receiver 212, the third data signal driver and receiver 213, and the fourth data signal driver and receiver 214 may transmit the data signal DQ of the high level to the memory controller 120 by pulling up a voltage of the data pad. Each of the first data signal driver and receiver 211, the second data signal driver and receiver 212, the third data signal driver and receiver 213, and the fourth data signal driver and receiver 214 may transmit the data signal DQ of the low level to the memory controller 120 by pulling down a voltage of the data pad.

Each of the first data signal driver and receiver 211, the second data signal driver and receiver 212, the third data signal driver and receiver 213, and the fourth data signal driver and receiver 214 may receive the data signal DQ of the high level by detecting the high level at the data pad. Each of the first data signal driver and receiver 211, the second data signal driver and receiver 212, the third data signal driver and receiver 213, and the fourth data signal driver and receiver 214 may receive the data signal DQ of the low level by detecting the low level at the data pad.

The buffer 220 may store the data signals DQ received by the first data signal driver and receiver 211, the second data signal driver and receiver 212, the third data signal driver and receiver 213, and the fourth data signal driver and receiver 214. The buffer 220 may store the data signals DQ to be output to the first data signal driver and receiver 211, the second data signal driver and receiver 212, the third data signal driver and receiver 213, and the fourth data signal driver and receiver 214.

For example, the data signals DQ may be identified as a command in response to that a specific first signal (e.g., a command latch enable signal) among the first control signals CT1 is activated. The buffer 220 may store the data signals DQ identified as a command. The data signals DQ may be identified as an address in response to that a specific second signal (e.g., an address latch enable signal) among the first control signals CT1 is activated. The buffer 220 may store the data signals DQ identified as an address. The data signals DQ may be identified as data in response to that the specific first signal or the specific second signal among the first control signals CT1 is deactivated. The buffer 220 may store the data signals DQ identified as data.

The command parser 230 may parse the command stored in the buffer 220. When the command stored in the buffer 220 is a command for requesting the first-type ZQ calibration, the command parser 230 may activate a first ZQ enable signal ZQEN1. The first ZQ enable signal ZQEN1 may allow the memory device 200 to perform the first-type ZQ calibration. A difference between the first-type ZQ calibration and the second-type ZQ calibration is that the first-type ZQ calibration is in response to a command from the memory controller 120 (via ZQ Requestor 121), see FIG. 2 item S100, and the second-type ZQ calibration is initiated by the ZQ Core 240 without a command from the memory controller 120, see FIG. 2 item S200.

The ZQ core 240 may perform the ZQ calibration by using a voltage of the ZQ pad ZQP connected to the external resistor REXT, for example, an external voltage VEXT. For example, the ZQ core 240 may perform the ZQ calibration in response to that the first ZQ enable signal ZQEN1 or a second ZQ enable signal ZQEN2 is activated. The ZQ core 240 may generate ZQ codes ZQCD as a result of the ZQ calibration. The ZQ codes ZQCD may be transferred to the first data signal driver and receiver 211, the second data signal driver and receiver 212, the third data signal driver and receiver 213, and the fourth data signal driver and receiver 214.

The ZQ codes ZQCD may be used for each of the first data signal driver and receiver 211, the second data signal driver and receiver 212, the third data signal driver and receiver 213, and the fourth data signal driver and receiver 214 to adjust an intensity of pulling up the voltage of the data pad and an intensity of pulling down the voltage of the data pad. Also, the ZQ codes ZQCD may be used for each of the first data signal driver and receiver 211, the second data signal driver and receiver 212, the third data signal driver and receiver 213, and the fourth data signal driver and receiver 214 to adjust pull-up resistance values and pull-down resistance values of the on-die termination at the time of receiving the data signals DQ.

When the ZQ calibration is completed, the ZQ core 240 may generate a ZQ end signal ZQED.

The ZQ initiator 250 may include a register 251, a counter 252, and a logic circuit 253. The register 251 may store a threshold value. For example, the memory controller 120 may store the threshold value in the register 251.

The counter 252 may perform a counting operation. For example, the counter 252 may count the lapse of time (or may count a time which elapses). As another example, the counter 252 may count the number of times of a specific command (e.g., at least one of the write, read, erase, pre-charge, and refresh commands) received as the data signals DQ. The counter 252 may be initialized in response to a pulse output from the pulse generator 290.

The logic circuit 253 may compare the threshold value stored in the register 251 with a count value of the counter 252. For example, when the count value of the counter 252 reaches the threshold value stored in the register 251, the logic circuit 253 may output a signal of the high level. As another example, when the count value of the counter 252 is greater than or equal to the threshold value stored in the register 251, the logic circuit 253 may output the signal of the high level. When the logic circuit 253 outputs the signal of the high level, the memory device 200 may initiate the second-type ZQ calibration.

An embodiment where the logic circuit 253 is implemented with an AND gate is illustrated. However, this is only an example of implementing the logic circuit 253. The logic circuit 253 may be variously implemented with a circuit including more components including an AND gate, or another type of circuit not including an AND gate.

The collision preventer 260 may operate in response to the logic circuit 253 of the ZQ initiator 250 outputting the signal of the high level. The collision preventer 260 may determine whether another memory device sharing lines of the data signals DQ or the external resistor REXT is currently performing the ZQ calibration.

The collision preventer 260 may include a voltage generator 261, a comparator 262, and a transistor 263. The voltage generator 261 may generate a first reference voltage VREF1 in response to the logic circuit 253 of the ZQ initiator 250 outputting the signal of the high level.

The comparator 262 may compare the first reference voltage VREF1 output from the voltage generator 261 with the external voltage VEXT of the ZQ pad ZQP. When the external voltage VEXT is higher than (or equal to or higher than) the first reference voltage VREF1, the comparator 262 may output a signal of the high level. When the external voltage VEXT is lower than (or equal to or lower than) the first reference voltage VREF1, the comparator 262 may output a signal of the low level.

The transistor 263 may include a gate receiving a signal between a first delay 271 and a second delay 272 of the delay chain 270, a first terminal connected to the comparator 262, and a second terminal connected to the ground node to which the ground voltage VSS is applied. A voltage of the gate of the transistor 263 may be set to the high level after a delay time of the first delay 271 passes from a point in time when the output of the logic circuit 253 of the ZQ initiator 250 is set to the high level. When the voltage of the gate of the transistor 263 is set to the high level, the transistor 263 may form a current path between the ground node and the comparator 262 such that the comparator 262 is activated.

That is, when the output of the logic circuit 253 is activated, the voltage generator 261 may generate the first reference voltage VREF1. Because the voltage generator 261 does not generate the first reference voltage VREF1 before the start of the second-type ZQ calibration, the power consumption of the voltage generator 261 may be reduced.

When the delay time of the first delay 271 of the delay chain 270 passes after the voltage generator 261 generates the first reference voltage VREF1, the transistor 263 may activate the comparator 262. When the second-type ZQ calibration is initiated, because the comparator 262 is not activated before the delay time of the first delay 271 passes, the power consumption of the comparator 262 may be reduced. Also, because the voltage generator 261 generates the first reference voltage VREF1 and then the comparator 262 is activated after the delay time of the first delay 271 passes, the comparator 262 may compare the first reference voltage VREF1 and the external voltage VEXT after the first reference voltage VREF1 is stabilized. Accordingly, the reliability of the comparator 262 is improved.

In an embodiment, while the memory device 200 does not perform the first-type ZQ calibration or the second-type ZQ calibration, the ZQ core 240 may connect the ZQ pad ZQP to a high impedance (High-Z). Accordingly, the voltage of the ZQ pad ZQP may be the ground voltage VSS.

While the memory device 200 performs the first-type ZQ calibration or the second-type ZQ calibration, the memory device 200 may connect the ZQ pad ZQP to a power node, to which a power supply voltage is supplied, through transistors. Accordingly, the voltage of the ZQ pad ZQP may be higher than the ground voltage VSS.

When the second-type ZQ calibration is initiated by the ZQ initiator 250 and the external voltage VEXT is higher than the first reference voltage VREF1, the comparator 262 may output the signal of the high level, and thus, that any other memory device sharing the external voltage VEXT is performing the ZQ calibration may be identified. When the second-type ZQ calibration is initiated by the ZQ initiator 250 and the external voltage VEXT is lower than the first reference voltage VREF1, the comparator 262 may output the signal of the low level, and thus, that any other memory device sharing the external voltage VEXT is not performing the ZQ calibration may be identified.

In an embodiment, the level of the first reference voltage VREF1 may be defined based on the level of the external voltage VEXT while the ZQ calibration is performed. For example, the level of the first reference voltage VREF1 may be defined as a level between the ground voltage VSS and the lowest level which the external voltage VEXT has while the ZQ calibration is performed.

The delay chain 270 may include the first delay 271 and the second delay 272. The first delay 271 may delay and output the output of the logic circuit 253 of the ZQ initiator 250. The second delay 272 may delay and output the output of the first delay 271.

The ZQ commander 280 may generate the second ZQ enable signal ZQEN2 which allows the ZQ core 240 to start the second-type ZQ calibration. For example, when the start of the second-type ZQ calibration is detected by the ZQ initiator 250 and it is detected by the collision preventer 260 that any other memory device is not under the execution of the first-type ZQ calibration or the second-type ZQ calibration, the ZQ commander 280 may activate the second ZQ enable signal ZQEN2.

When the start of the second-type ZQ calibration is detected by the ZQ initiator 250 and it is detected by the collision preventer 260 that any other memory device is under the execution of the first-type ZQ calibration or the second-type ZQ calibration, the ZQ commander 280 may deactivate the second ZQ enable signal ZQEN2. When the start of the second-type ZQ calibration is not detected by the ZQ initiator 250, the ZQ commander 280 may deactivate the second ZQ enable signal ZQEN2.

The ZQ commander 280 may include a pulse generator 281 and a flip-flop 282. In response to the output of the second delay 272 of the delay chain 270 transitioning to the high level, the pulse generator 281 may generate a pulse signal which transitions from the low level to the high level and transitions from the high level to the low level (i.e., the pulse signal toggles). The pulse signal of the pulse generator 281 may be transferred as a clock input of the flip-flop 282.

The flip-flop 282 may receive the output of the comparator 262 of the collision preventer 260 as an input "D". In an embodiment, after the ZQ initiator 250 outputs the signal of the high level as a result of detecting the second-type ZQ calibration and then the delay time of the first delay 271 of the delay chain 270 passes, the collision preventer 260 may output a collision detection result.

When any other memory device sharing the external resistor REXT is performing the first-type ZQ calibration or the second-type ZQ calibration, the collision preventer 260 may transfer a signal of the low level, which indicates that the collision is made, to the input "D" of the flip-flop 282. When any other memory device sharing the external resistor REXT is not performing the first-type ZQ calibration or the second-type ZQ calibration, the collision preventer 260 may transfer a signal of the high level, which indicates that the collision is not made, to the input "D" of the flip-flop 282.

After the collision preventer 260 transfers the signal indicating whether the collision is made to the input "D" of the flip-flop 282 and then the delay time of the second delay 272 of the delay chain 270 passes, the flip-flop 282 may transfer the signal of the input "D" to an output "Q" in synchronization with the pulse of the pulse generator 281. The signal of the output "Q" may be transferred to the ZQ core 240 as the second ZQ enable signal ZQEN2. In an embodiment, the flip-flop 282 may include a D-flip-flop.

Because the signal of the input "D" is transferred to the output "Q" after the comparator 262 of the collision preventer 260 starts to output the comparison result and then the delay time of the second delay 272 of the delay chain 270 passes, the flip-flop 282 may transfer the output of the comparator 262 to the output "Q" of the flip-flop 282 after the output of the comparator 262 is stabilized. Accordingly, the reliability of the flip-flop 282 and the second ZQ enable signal ZQEN2 may be improved.

The pulse generator 290 may receive the ZQ end signal ZQED from the ZQ core 240. In response to the ZQ end signal ZQED being activated, the pulse generator 290 may generate a pulse signal which transitions from the low level to the high level and transitions from the high level to the low level (i.e. the pulse signal toggles). The pulse signal of the pulse generator 290 may be transferred to a reset input of the flip-flop 282 of the ZQ commander 280 and may be transferred to the counter 252. The pulse signal of the pulse generator 290 may reset the flip-flop 282 of the ZQ commander 280 and may reset the count value of the counter 252.

Figure 4:
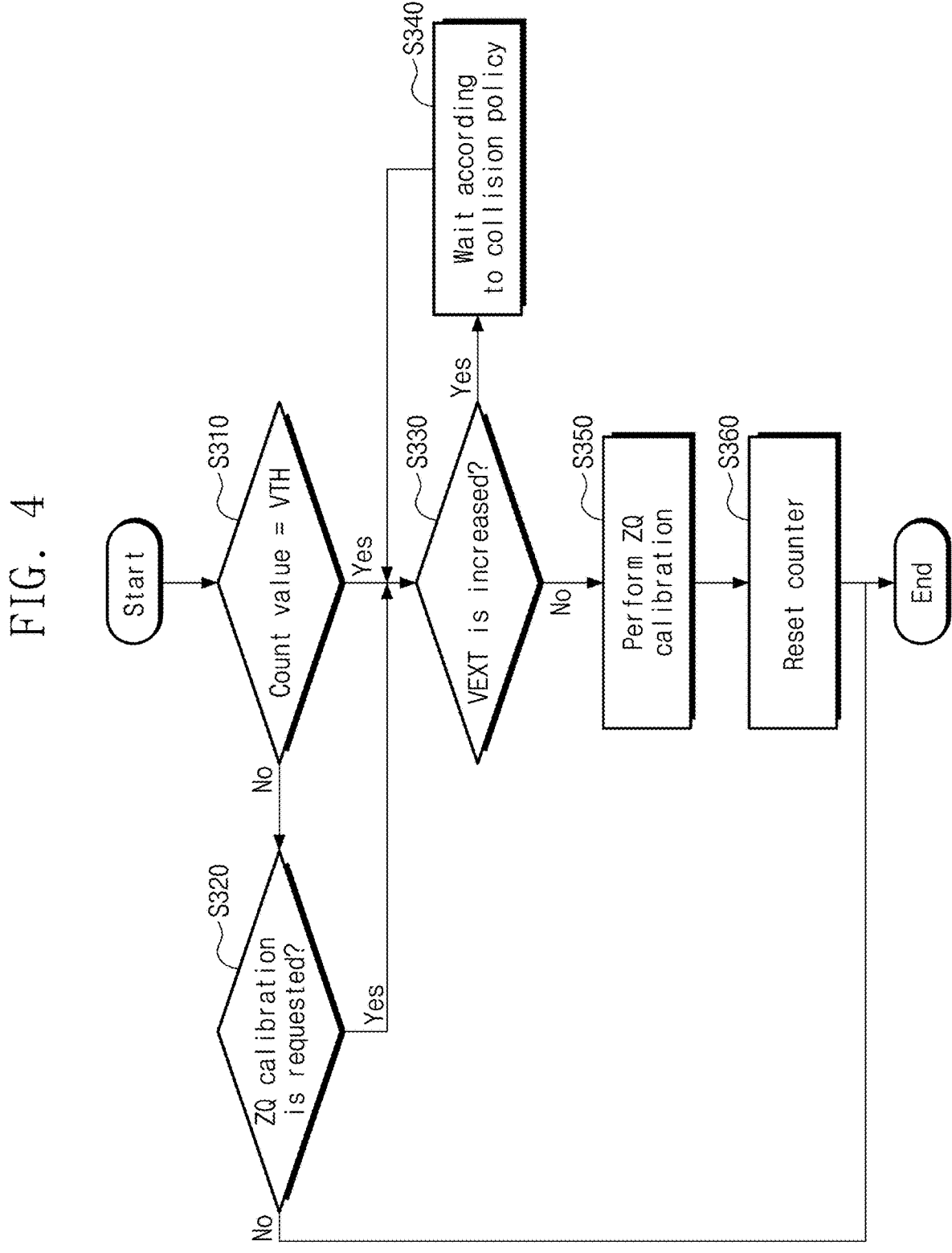
FIG. 4 illustrates an example of an operating method of a memory device.

FIG. 4 illustrates an example of an operating method of the memory device 200. Referring to FIGS. 1, 3, and 4, in operation S310, the memory device 200 may determine whether a count value is identical to a threshold value VTH. For example, the logic circuit 253 of the ZQ initiator 250 may determine whether the count value of the counter 252 reaches the threshold value VTH stored in the register 251.

When the count value is not identical to the threshold value VTH, in operation S320, the memory device 200 may determine whether the ZQ calibration is requested. For example, the ZQ core 240 may determine whether the first ZQ enable signal ZQEN1 is activated by a command of the memory controller 120, which requests the ZQ calibration. When the ZQ calibration is not requested, the memory device 200 may end the process associated with the ZQ calibration.

When the count value is identical to the threshold value VTH (Yes in operation S310) or when the ZQ calibration is requested, the memory device 200 may perform operation S330. In operation S330, the memory device 200 may determine whether the external voltage VEXT is increased. For example, the comparator 262 of the collision preventer 260 may determine whether the external voltage VEXT is higher than the first reference voltage VREF1.

When it is determined that the external voltage VEXT is increased, in operation S340, the memory device 200 may wait according to a collision policy. For example, when the counter 252 of the ZQ initiator 250 counts a number of receptions of a specific command, the collision policy may include a policy where the memory device 200 waits until the specific command is again received and again starts the second-type ZQ calibration after the specific command is received. When the counter 252 of the ZQ initiator 250 counts a specific command or a time, the collision policy may include a policy where the memory device 200 waits during a standby time and then again starts the second-type ZQ calibration. In an embodiment, because the first-type ZQ calibration is controlled by the memory controller 120, the collision may not occur.

In operation S350, the memory device 200 may perform the ZQ calibration. For example, the memory device 200 may perform the first-type ZQ calibration or the second-type ZQ calibration.

In operation S360, the memory device 200 may reset the counter 252. For example, after the first-type ZQ calibration or the second-type ZQ calibration is completed, the pulse generator 290 of the memory device 200 may reset the counter 252 in response to the ZQ end signal ZQED. The counter 252 may be reset even after not the second-type ZQ calibration but the first-type ZQ calibration is completed. In this case, an interval where the ZQ calibration is performed may be prevented from being smaller than the threshold value VTH stored in the register 251, and the ZQ calibration may be prevented from being excessively performed. In an embodiment, the pulse generator 290 may also reset the flip-flop 282.

Figure 5:
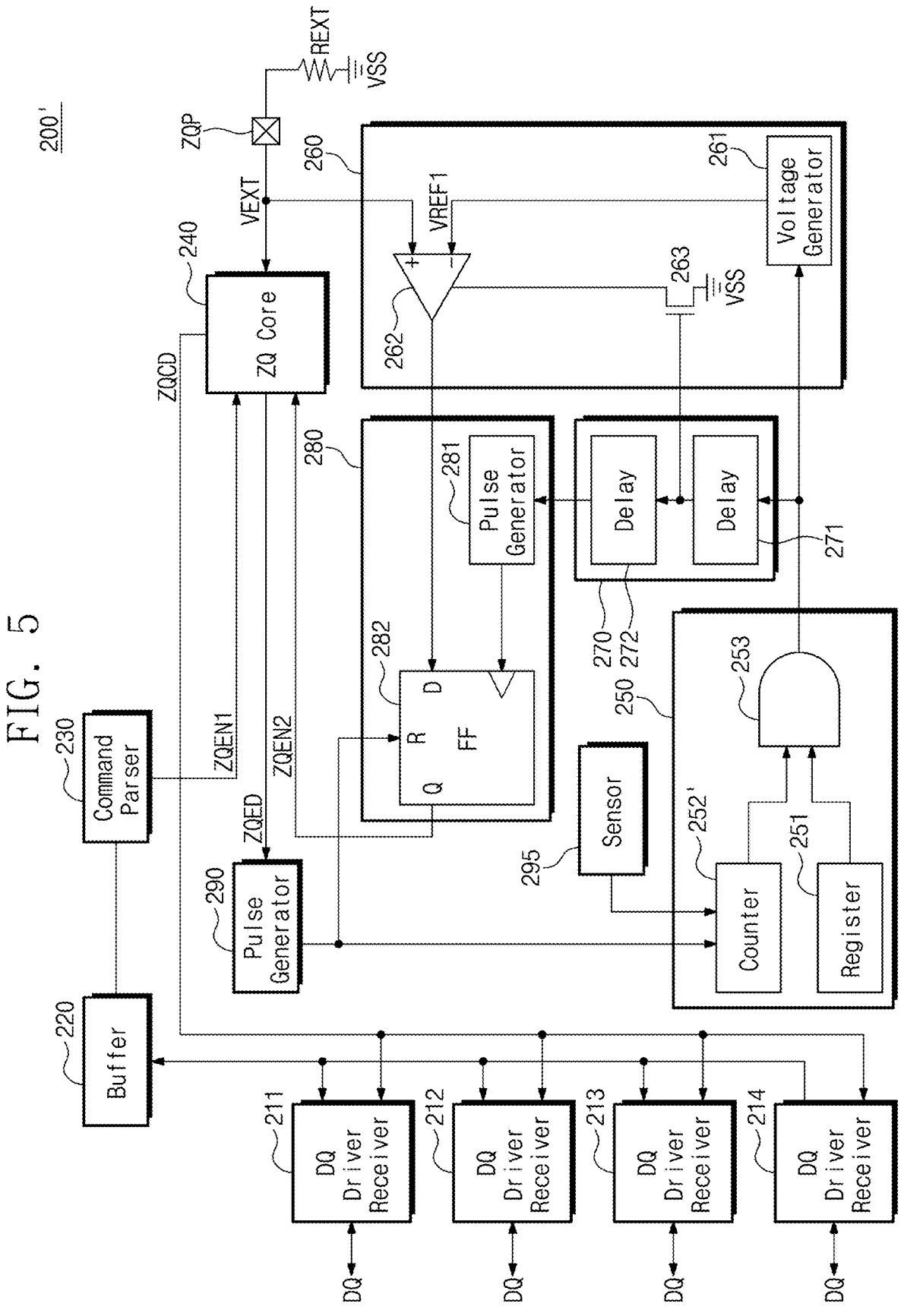
FIG. 5 illustrates a memory device according to another embodiment of the present disclosure.

FIG. 5 illustrates a memory device 200' according to another embodiment of the present disclosure. Compared to the memory device 200 of FIG. 3, the memory device 200' may further include a sensor 295. The sensor 295 may be a temperature sensor. The sensor 295 may sense a temperature and may provide temperature information to a counter 252'.

When the temperature information provided from the sensor 295 indicates a temperature higher than a threshold temperature, the counter 252' may perform (or resume) the counting operation. When the temperature information provided from the sensor 295 indicates a temperature lower than or equal to the threshold temperature, the counter 252' may stop the counting operation. That is, the counter 252' may count a time during which the memory device 200' is exposed to an environment whose temperature is higher than the threshold temperature.

That is, the time during which the memory device 200' is exposed to the environment whose temperature is higher than the threshold temperature reaches a threshold value stored in the register 251, the memory device 200' may perform the second-type ZQ calibration. For example, the threshold temperature may be set by the memory controller 120. The threshold temperature or the threshold value may be defined based on features associated with a temperature.

For example, performance may depend on temperature. The threshold temperature may be defined in terms of performance variation. Performance may be in terms of input or output impedance, slew time from low to high or high to low, or other circuit characteristics. For example, as a degree by which a performance of the first data signal driver and receiver 211, the second data signal driver and receiver 212, the third data signal driver and receiver 213, and the fourth data signal driver and receiver 214 of the memory device 200' varies more depending on a temperature, the threshold temperature or the threshold value may be defined as a corresponding lower value. As the degree by which the performance of the first data signal driver and receiver 211, the second data signal driver and receiver 212, the third data signal driver and receiver 213, and the fourth data signal driver and receiver 214 of the memory device 200' varies less depending on a temperature, the threshold temperature or the threshold value may be defined as a correspondingly higher value.

Figure 6:
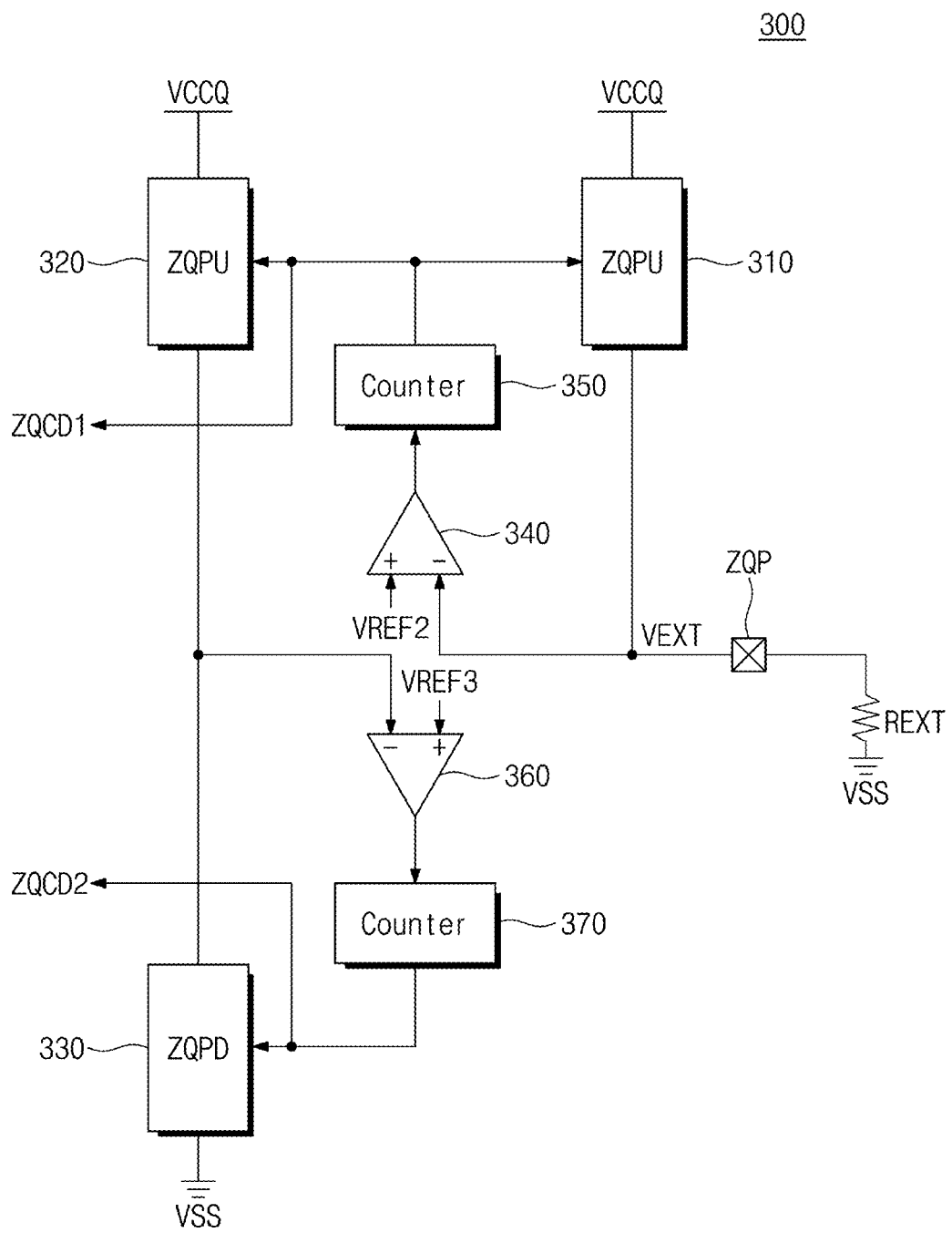
FIG. 6 illustrates a ZQ core according to an embodiment of the present disclosure.

FIG. 6 illustrates a ZQ core 300 according to an embodiment of the present disclosure. The ZQ core 300 may correspond to the ZQ core 240 of FIG. 3 or 5. Referring to FIGS. 3, 5, and 6, the ZQ core 300 may include a first pull-up ZQ circuit (ZQPU) 310, a second pull-up ZQ circuit (ZQPU) 320, a pull-down ZQ circuit (ZQPD) 330, a first comparator 340, a first counter 350, a second comparator 360, and a second counter 370.

The first pull-up ZQ circuit 310 may be connected between a power node to which a first power supply voltage VCCQ and the ZQ pad ZQP. That is, the first pull-up ZQ circuit 310 and the external resistor REXT may be connected in series between the power node to which the first power supply voltage VCCQ is applied and the ground node to which the ground voltage VSS is applied. The first pull-up ZQ circuit 310 may include a plurality of switches (e.g., transistors) which are connected in parallel between the power node and the ZQ pad ZQP. The plurality of switches may be respectively turned on or turned off in response to bits of a count value transferred from the first counter 350.

The second pull-up ZQ circuit 320 and the pull-down ZQ circuit 330 may be connected in series between the power node to which the first power supply voltage VCCQ is applied and the ground node to which the ground voltage VSS is applied. The second pull-up ZQ circuit 320 may include a plurality of switches (e.g., transistors) which are connected in parallel. The plurality of switches of the second pull-up ZQ circuit 320 may be respectively turned on or turned off in response to the bits of the count value ZQCD1 transferred from the first counter 350. The pull-down ZQ circuit 330 may include a plurality of switches (e.g., transistors) which are connected in parallel. In some embodiments, the pull-down ZQ circuit 330 includes a string of series resistors which form a voltage ladder configured by the plurality of switches (similarly the pull-up ZQ circuit 320 and the pull-up ZQ circuit 310). The plurality of switches of the pull-down ZQ circuit 330 may be respectively turned on or turned off in response to bits of a count value transferred from the second counter 370 ZQCD2.

The first comparator 340 may compare a second reference voltage VREF2 and the external voltage VEXT. When the external voltage VEXT is lower than (or lower than or equal to) the second reference voltage VREF2, the first comparator 340 may output a signal of the high level; when the external voltage VEXT is higher than (or higher than or equal to) the second reference voltage VREF2, the first comparator 340 may output a signal of the low level.

The first counter 350 may operate in response to an output voltage of the first comparator 340. For example, the first counter 350 may perform the counting operation when the output voltage of the first comparator 340 is at the high level (or the low level). The first counter 350 may stop the counting operation when the output voltage of the first comparator 340 is at the low level (or the high level).

As the count (or count value) of the first counter 350 increases, the switches of each of the first pull-up ZQ circuit 310 and the second pull-up ZQ circuit 320 may be sequentially turned on (or turned off). As the count value increases until the output voltage of the first comparator 340 transitions (or is flipped), the first counter 350 may increase the number of switches turned on (or turned off) from among the switches of each of the first pull-up ZQ circuit 310 and the second pull-up ZQ circuit 320 until the output voltage of the first comparator 340 transitions.

That is, the first counter 350 may gradually increase (or decrease) the capability by which each of the first pull-up ZQ circuit 310 and the second pull-up ZQ circuit 320 transfers the first power supply voltage VCCQ, that is, may adjust the driving capability of each of the first pull-up ZQ circuit 310 and the second pull-up ZQ circuit 320. The level of the second reference voltage VREF2 may be defined such that the driving capability of each of the first pull-up ZQ circuit 310 and the second pull-up ZQ circuit 320 is optimized. In an embodiment, the level of the second reference voltage VREF2 may be set to half the first power supply voltage VCCQ or a level similar thereto.

Bits of the count value which are generated at a point in time when the output voltage of the first comparator 340 transitions or flips (or immediately before a point in time when the output voltage of the first comparator 340 transitions or flips) may be first ZQ codes ZQCD1. As a portion of the ZQ codes ZQCD, the first ZQ codes ZQCD1 may be transferred to the first data signal driver and receiver 211, the second data signal driver and receiver 212, the third data signal driver and receiver 213, and the fourth data signal driver and receiver 214.

The second comparator 360 may compare a third reference voltage VREF3 with a voltage of a node between the second pull-up ZQ circuit 320 and the pull-down ZQ circuit 330. When the voltage of the node between the second pull-up ZQ circuit 320 and the pull-down ZQ circuit 330 is lower than (or lower than or equal to) the third reference voltage VREF3, the second comparator 360 may output a signal of the high level; when the voltage of the node between the second pull-up ZQ circuit 320 and the pull-down ZQ circuit 330 is higher than (or higher than or equal to) the third reference voltage VREF3, the second comparator 360 may output a signal of the low level.

The second counter 370 may operate in response to an output voltage of the second comparator 360. For example, the second counter 370 may perform the counting operation when the output voltage of the second comparator 360 is at the high level (or the low level). The second counter 370 may stop the counting operation when the output voltage of the second comparator 360 is at the low level (or the high level).

As the count (or count value) of the second counter 370 increases, the switches of the pull-down ZQ circuit 330 may be sequentially turned on (or turned off). As the count value increases until the output voltage of the second comparator 360 transitions or flips, the second counter 370 may increase the number of switches turned on (or turned off) from among the switches of the pull-down ZQ circuit 330 until the output voltage of the second comparator 360 transitions.

That is, the second counter 370 may gradually increase (or decrease) the capability by which the pull-down ZQ circuit 330 transfers the ground voltage VSS, that is, may adjust the driving capability of the pull-down ZQ circuit 330. The level of the third reference voltage VREF3 may be defined such that the driving capability of the pull-down ZQ circuit 330 is optimized. In an embodiment, the level of the third reference voltage VREF3 may be set to half the first power supply voltage VCCQ or a level similar thereto.

Bits of the count value which are generated at a point in time when the output voltage of the second comparator 360 transitions or flips (or immediately before a point in time when the output voltage of the second comparator 360 transitions or flips) may be second ZQ codes ZQCD2. As a portion of the ZQ codes ZQCD, the second ZQ codes ZQCD2 may be transferred to the first data signal driver and receiver 211, the second data signal driver and receiver 212, the third data signal driver and receiver 213, and the fourth data signal driver and receiver 214.

Figure 7:
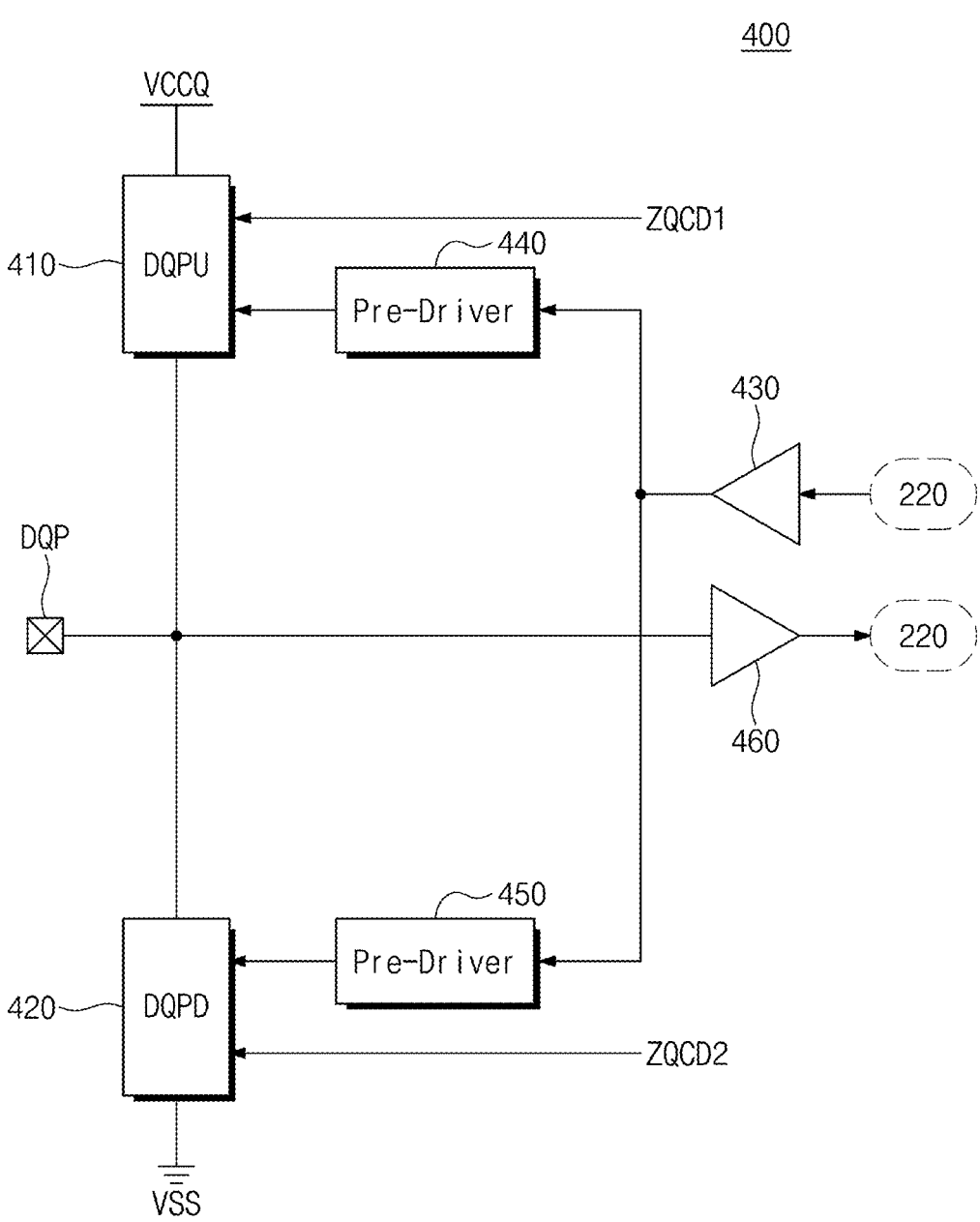
FIG. 7 illustrates a data signal driver and receiver according to an embodiment of the present disclosure.

FIG. 7 illustrates a data signal driver and receiver 400 according to an embodiment of the present disclosure. In an embodiment, the data signal driver and receiver 400 may correspond to each of the first data signal driver and receiver 211, the second data signal driver and receiver 212, the third data signal driver and receiver 213, and the fourth data signal driver and receiver 214 of FIGS. 3 and 5.

Referring to FIGS. 3, 5, and 7, the data signal driver and receiver 400 may include a pull-up DQ circuit (DQPU) 410, a pull-down DQ circuit (DQPD) 420, a driving buffer 430, a first pre-driver 440, a second pre-driver 450, a reception buffer 460, and a DQ pad DQP. The pull-up DQ circuit 410 and the pull-down DQcicuit 420 are structurally similar to the pull-up ZQ circuit 320 and the pull-down ZQ circuit 330.

The pull-up DQ circuit 410 and the pull-down DQ circuit 420 may be connected in series between the power node to which the first power supply voltage VCCQ is applied and the ground node to which the ground voltage VSS is applied. The pull-up DQ circuit 410 may include a plurality of switches (e.g., transistors) which are connected in parallel. The plurality of switches of the pull-up DQ circuit 410 may be respectively turned on or turned off in response to the bits of the first ZQ codes ZQCD1. The pull-down DQ circuit 420 may include a plurality of switches (e.g., transistors) which are connected in parallel. The plurality of switches of the pull-down DQ circuit 420 may be respectively turned on or turned off in response to the bits of the second ZQ codes ZQCD2.

The first ZQ codes ZQCD1 may be used to adjust the capability by which the pull-up DQ circuit 410 transfers the first power supply voltage VCCQ to the DQ pad DQP. The second ZQ codes ZQCD2 may be used to adjust the capability by which the pull-down DQ circuit 420 transfers the ground voltage VSS to the DQ pad DQP.

The driving buffer 430 may receive data from the buffer 220. The driving buffer 430 may transfer the received data to the first pre-driver 440 and the second pre-driver 450. The first pre-driver 440 and the second pre-driver 450 may convert a level of a voltage of the data transferred from the driving buffer 430 so as to be appropriate to levels of voltages of the pull-up DQ circuit 410 and the pull-down DQ circuit 420.

For example, when a data bit is at the high level, the first pre-driver 440 may activate the pull-up DQ circuit 410, and the second pre-driver 450 may deactivate the pull-down DQ circuit 420. In this case, the pull-up DQ circuit 410 may output the first power supply voltage VCCQ to the DQ pad DQP. When a data bit is at the low level, the first pre-driver 440 may deactivate the pull-up DQ circuit 410, and the second pre-driver 450 may activate the pull-down DQ circuit 420. In this case, the pull-down DQ circuit 420 may output the ground voltage VSS to the DQ pad DQP.

Figure 8:
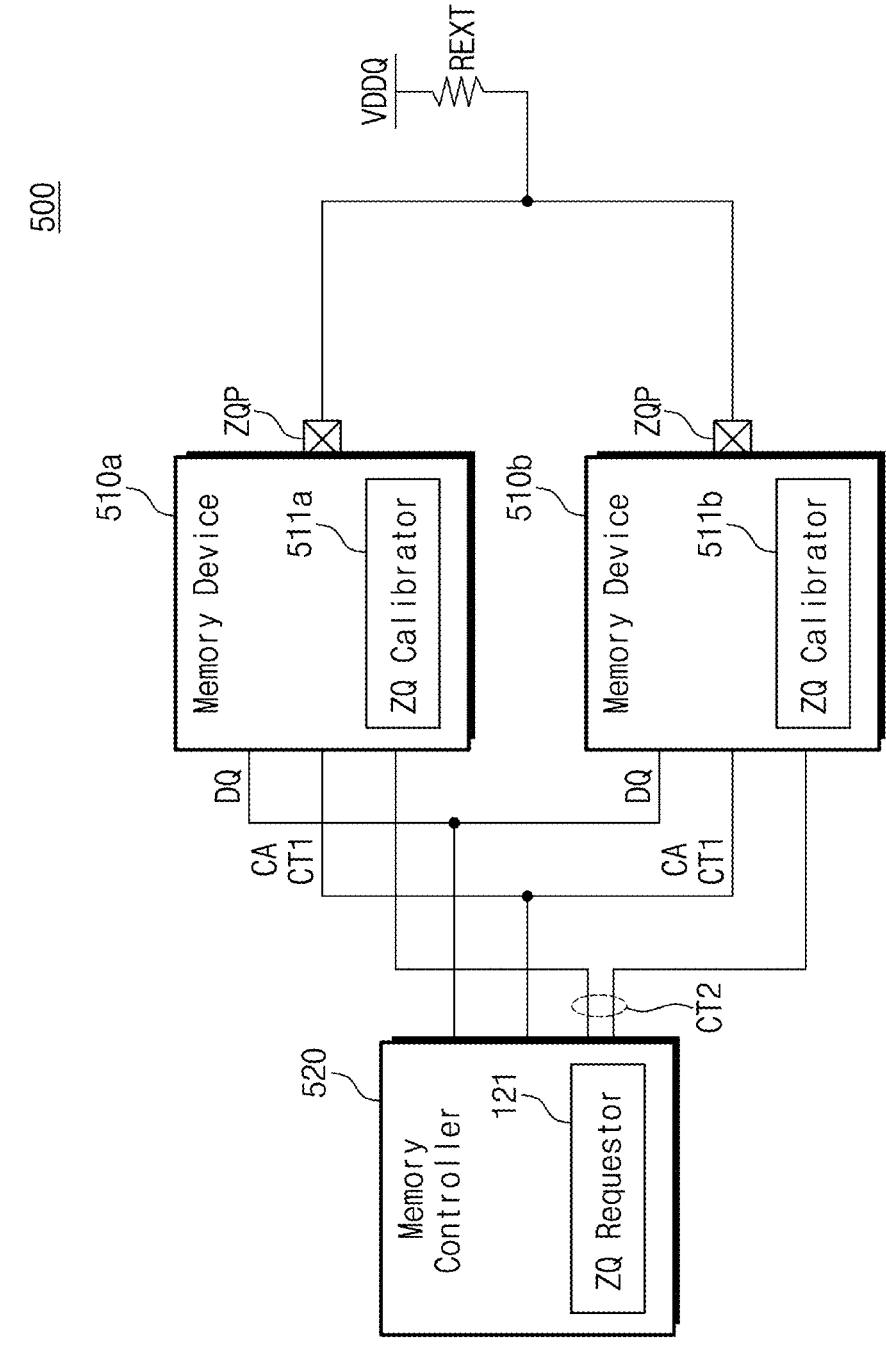
FIG. 8 illustrates an example of a memory system according to another embodiment of the present disclosure.

FIG. 8 illustrates a memory system 500 according to another embodiment of the present disclosure. Referring to FIG. 8, the memory system 500 may include a first memory device 510a, a second memory device 510b, a memory controller 520, and the external resistor REXT.

The first memory device 510a and the second memory device 510b may perform the communication of the data signals DQ with the memory controller 520 through common lines (or wires). For example, each of the first memory device 510a and the second memory device 510b may include data pads configured to communicate the data signals DQ. For example, the data signals DQ may include data.

The first memory device 510a and the second memory device 510b may receive a command/address CA from the memory controller 520 through the common lines. The first memory device 510a and the second memory device 510b may perform the communication of the first control signals CT1 with the memory controller 520 through the common lines. For example, each of the first memory device 510a and the second memory device 510b may include command and address pads configured to communicate the command/address CA and first control pads configured to communicate the first control signals CT1.

The first memory device 510a and the second memory device 510b may perform the communication of the second control signals CT2 with the memory controller 520 through independent lines. For example, each of the first memory device 510a and the second memory device 510b may include second control pads configured to communicate the second control signals CT2. In an embodiment, the second control signals CT2 may include signals for enabling the first memory device 510a and the second memory device 510b, respectively.

The first memory device 510a and the second memory device 510b may be implemented with the same configuration and may operate in the same method. The first memory device 510a may include a ZQ pad ZQP and a ZQ calibrator 511a, and the second memory device 510b may include a ZQ pad ZQP and a ZQ calibrator 511b.

The ZQ pad ZQP of the first memory device 510a and the ZQ pad ZQP of the second memory device 510b may be connected in common to the external resistor REXT. The external resistor REXT may be connected to a power node to which a second power supply voltage VDDQ (or VDDQL) is applied. The ZQ calibrator 511a or 511b may perform ZQ calibration by using the external resistor REXT. The ZQ calibration may include detecting codes for calibrating drivers of the first memory device 510a and the second memory device 510b, which are used to transmit the data signals DQ to the memory controller 520 through the common lines. The ZQ calibrator 511a may detect codes indicating a driving intensity for pulling up the data signals DQ and a driving strength for pulling down the data signals DQ.

The memory controller 520 may include a ZQ requestor 521. Depending on an internal calibration policy, the ZQ requestor 521 may transmit commands for requesting the first memory device 510a and the second memory device 510b to perform the ZQ calibration, to the first memory device 510a and the second memory device 510b, respectively. For example, the calibration policy may be set by an external host device or may be set in the process of manufacturing the memory controller 520. The memory controller 520 may be configured to adaptively adjust the calibration policy.

In an embodiment, each of the first memory device 510a and the second memory device 510b may be implemented with a random access memory such as a dynamic random access memory device or a static random access memory device.

In an embodiment, the first memory device 510a and the second memory device 510b may be implemented with one semiconductor package, for example, a multi-die package. As another example, the first memory device 510a and the second memory device 510b may be implemented with different semiconductor packages. The external resistor REXT may be formed in the substrate on which the semiconductor package(s) is mounted.

The memory system 500 may operate in the same method as described with reference to FIG. 2. The first memory device 510a and the second memory device 510b of the memory system 500 may perform the first-type ZQ calibration in response to the request of the memory controller 520. The first memory device 510a and the second memory device 510b of the memory system 500 may perform the second-type ZQ calibration without the request of the memory controller 520.

Figure 9:
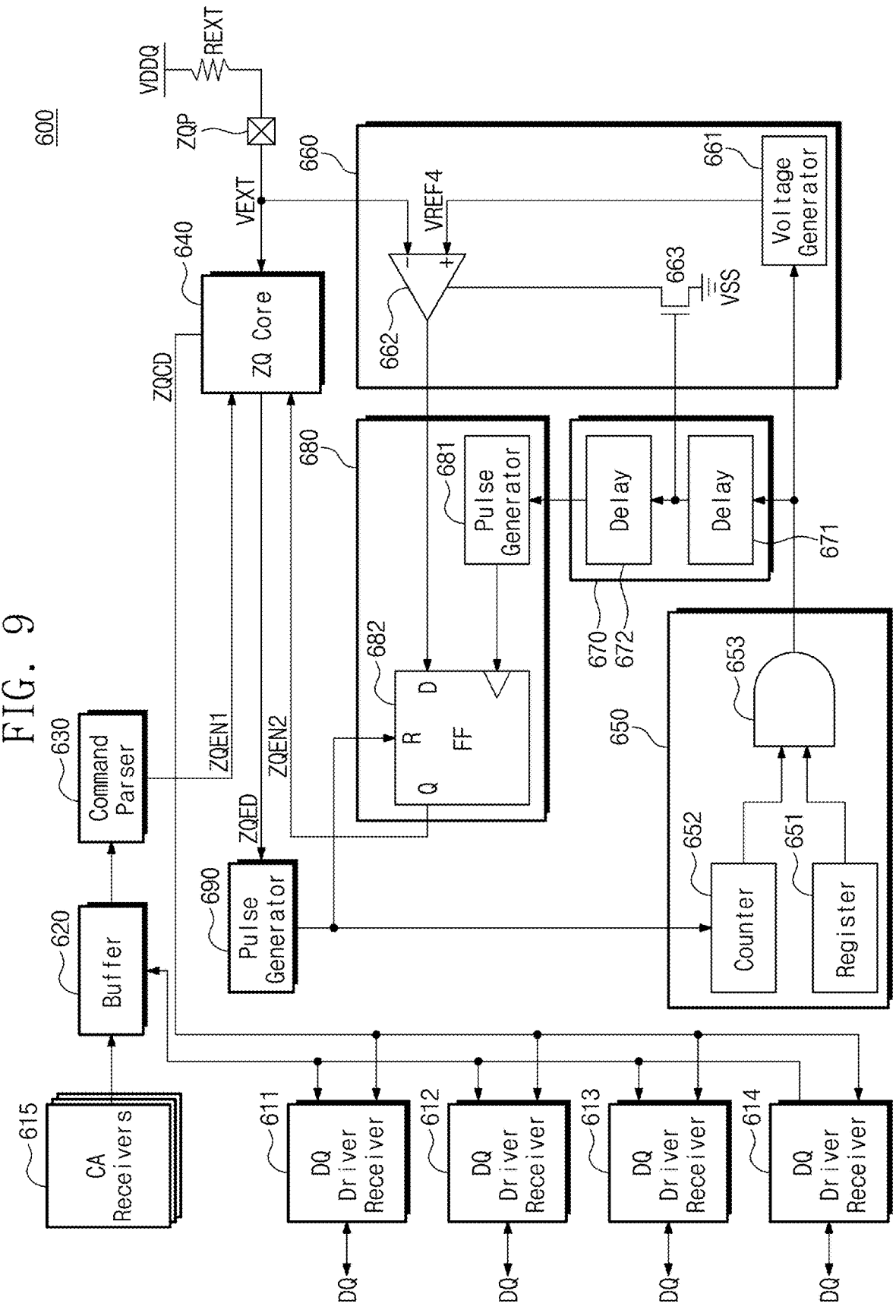
FIG. 9 illustrates an example of components associated with ZQ calibration from among components of a first memory device or a second memory device.

FIG. 9 illustrates an example of components associated with ZQ calibration from among components of the first memory device 510a or the second memory device 510b. Referring to FIGS. 8 and 9, a memory device 600 may include components associated with the ZQ calibration from among components of the first memory device 510a or the second memory device 510b.

For example, the memory device 600 may include a first data signal driver and receiver 611, a second data signal driver and receiver 612, a third data signal driver and receiver 613, a fourth data signal driver and receiver 614, command and address receivers 615, a buffer 620, a command parser 630, a ZQ core 640, a ZQ initiator 650, a collision preventer 660, a delay chain 670, a ZQ commander 680, and a pulse generator 690.

The first data signal driver and receiver 611, the second data signal driver and receiver 612, the third data signal driver and receiver 613, and the fourth data signal driver and receiver 614 may perform the communication of the data signals DQ with the memory controller 520. The first data signal driver and receiver 611, the second data signal driver and receiver 612, the third data signal driver and receiver 613, and the fourth data signal driver and receiver 614 may communicate the data signals DQ through data pads.

Configurations and operations of the first data signal driver and receiver 611, the second data signal driver and receiver 612, the third data signal driver and receiver 613, and the fourth data signal driver and receiver 614 may be the same as those of the first data signal driver and receiver 211, the second data signal driver and receiver 212, the third data signal driver and receiver 213, and the fourth data signal driver and receiver 214 described with reference to FIG. 3 except that a command and an address are not received as the data signals DQ. Thus, additional description will be omitted.

The buffer 620 may store the data signals DQ received by the first data signal driver and receiver 611, the second data signal driver and receiver 612, the third data signal driver and receiver 613, and the fourth data signal driver and receiver 614. The buffer 620 may store the data signals DQ to be output to the first data signal driver and receiver 611, the second data signal driver and receiver 612, the third data signal driver and receiver 613, and the fourth data signal driver and receiver 614. The buffer 620 may store the command/address CA received from the command and address receivers 615. For example, the buffer 620 may include a first buffer for the data signals DQ and a second buffer for the command/address CA.

The command parser 630 may parse the command stored in the buffer 620. When the command stored in the buffer 620 is a command for requesting the first-type ZQ calibration, the command parser 630 may activate the first ZQ enable signal ZQEN1. The first ZQ enable signal ZQEN1 may allow the memory device 600 to perform the first-type ZQ calibration.

The ZQ core 640 may perform the ZQ calibration by using a voltage of the ZQ pad ZQP connected to the external resistor REXT, for example, the external voltage VEXT. For example, the ZQ core 640 may perform the ZQ calibration in response to the first ZQ enable signal ZQEN1 or the second ZQ enable signal ZQEN2 being activated. The ZQ core 640 may generate the ZQ codes ZQCD as a result of the ZQ calibration. The ZQ codes ZQCD may be transferred to the first data signal driver and receiver 611, the second data signal driver and receiver 612, the third data signal driver and receiver 613, and the fourth data signal driver and receiver 614.

The ZQ codes ZQCD may be used for each of the first data signal driver and receiver 611, the second data signal driver and receiver 612, the third data signal driver and receiver 613, and the fourth data signal driver and receiver 614 to adjust an intensity of pulling up the voltage of the data pad and an intensity of pulling down the voltage of the data pad. Also, the ZQ codes ZQCD may be used for each of the first data signal driver and receiver 611, the second data signal driver and receiver 612, the third data signal driver and receiver 613, and the fourth data signal driver and receiver 614 to adjust pull-up resistance values and pull-down resistance values of the on-die termination at the time of receiving the data signals DQ.

When the ZQ calibration is completed, the ZQ core 640 may generate the ZQ end signal ZQED.

The ZQ initiator 650 may include a register 651, a counter 652, and a logic circuit 653. Configurations and operations of the register 651, the counter 652, and the logic circuit 653 of the ZQ initiator 650 may be the same as those of the register 251, the counter 252, and the logic circuit 253 of the ZQ initiator 250 described with reference to FIG. 3. Thus, additional description will be omitted.

The collision preventer 660 may operate in response to the logic circuit 653 of the ZQ initiator 650 outputting the signal of the high level. The collision preventer 660 may determine whether another memory device sharing lines of the data signals DQ or the external resistor REXT is currently performing the ZQ calibration.

The collision preventer 660 may include a voltage generator 661, a comparator 662, and a transistor 663. The voltage generator 661 may generate a fourth reference voltage VREF4 in response to the logic circuit 653 of the ZQ initiator 650 outputting the signal of the high level.

The comparator 662 may compare the fourth reference voltage VREF4 output from the voltage generator 661 with the external voltage VEXT of the ZQ pad ZQP. When the external voltage VEXT is lower than (or lower than or equal to) the fourth reference voltage VREF4, the comparator 662 may output a signal of the high level. When the external voltage VEXT is higher than (or higher than or equal to) the fourth reference voltage VREF4, the comparator 662 may output a signal of the low level.

The transistor 663 may include a gate receiving a signal between a first delay 671 and a second delay 672 of the delay chain 670, a first terminal connected to the comparator 662, and a second terminal connected to the ground node to which the ground voltage VSS is applied. A configuration and an operation of the transistor 663 may be the same as those of the transistor 263 described with reference to FIG. 3. Thus, additional description will be omitted.

In an embodiment, while the memory device 600 does not perform the first-type ZQ calibration or the second-type ZQ calibration, the ZQ core 640 may connect the ZQ pad ZQP to a high impedance (High-Z). Accordingly, the voltage of the ZQ pad ZQP may be the second power supply voltage VDDQ.

While the memory device 600 performs the first-type ZQ calibration or the second-type ZQ calibration, the memory device 600 may connect the ZQ pad ZQP to the ground node, to which the ground voltage VSS is supplied, through transistors. Accordingly, the voltage of the ZQ pad ZQP may be lower than the second power supply voltage VDDQ.

When the second-type ZQ calibration is initiated by the ZQ initiator 650 and the external voltage VEXT is lower than the fourth reference voltage VREF4, the comparator 662 may output the signal of the high level, and carrying out of the ZQ calibration is identified for this low VEXT. For example, carrying out of the ZQ calibration by any other memory device sharing the external voltage VEXT may be identified. When the second-type ZQ calibration is initiated by the ZQ initiator 650 and the external voltage VEXT is higher than the fourth reference voltage VREF4, the comparator 662 may output the signal of the low level, and lack of carrying out of the ZQ calibration is identified for this high VEXT. For example, not carrying out of the ZQ calibration by any other memory device sharing the external voltage VEXT may be identified.

In an embodiment, the level of the fourth reference voltage VREF4 may be defined based on the level of the external voltage VEXT while the ZQ calibration is performed. For example, the level of the fourth reference voltage VREF4 may be defined as a level between the second power supply voltage VDDQ and the highest level which the external voltage VEXT has while the ZQ calibration is performed.

The delay chain 670 may include the first delay 671 and the second delay 672. The first delay 671 may delay and output the output of the logic circuit 653 of the ZQ initiator 650. The second delay 672 may delay and output the output of the first delay 671.

The ZQ commander 680 may generate the second ZQ enable signal ZQEN2 which allows the ZQ core 640 to start the second-type ZQ calibration. The ZQ commander 680 may include a pulse generator 681 and a flip-flop 682. Configurations and operations of the pulse generator 681 and the flip-flop 682 of the ZQ commander 680 may be the same as those of the pulse generator 281 and the flip-flop 282 of the ZQ commander 280 described with reference to FIG. 3. Thus, additional description will be omitted.

The pulse generator 690 may receive the ZQ end signal ZQED from the ZQ core 640. In response to the ZQ end signal ZQED being activated, the pulse generator 690 may generate a pulse signal which transitions from the low level to the high level and transitions from the high level to the low level (i.e. the pulse toggles). The pulse signal of the pulse generator 690 may be transferred to a reset input of the flip-flop 682 of the ZQ commander 680 and may be transferred to the counter 652. The pulse signal of the pulse generator 690 may reset the flip-flop 682 of the ZQ commander 680 and may reset the count value of the counter 652.

In an embodiment, an operation of the memory device 600 may be similar to the operation described with reference to FIG. 4. For example, the operation of the memory device 600 may be the same as that described with reference to FIG. 4 except that the memory device 600 detects whether the external voltage VEXT is decreased, not increased.

In an embodiment, as described with reference to FIG. 5, the memory device 600 may further include a sensor. The sensor may sense a temperature and may provide temperature information to the counter 652. The counter 652 may perform the counting operation when the temperature indicated by the temperature information is higher than a threshold temperature.

Figure 10:
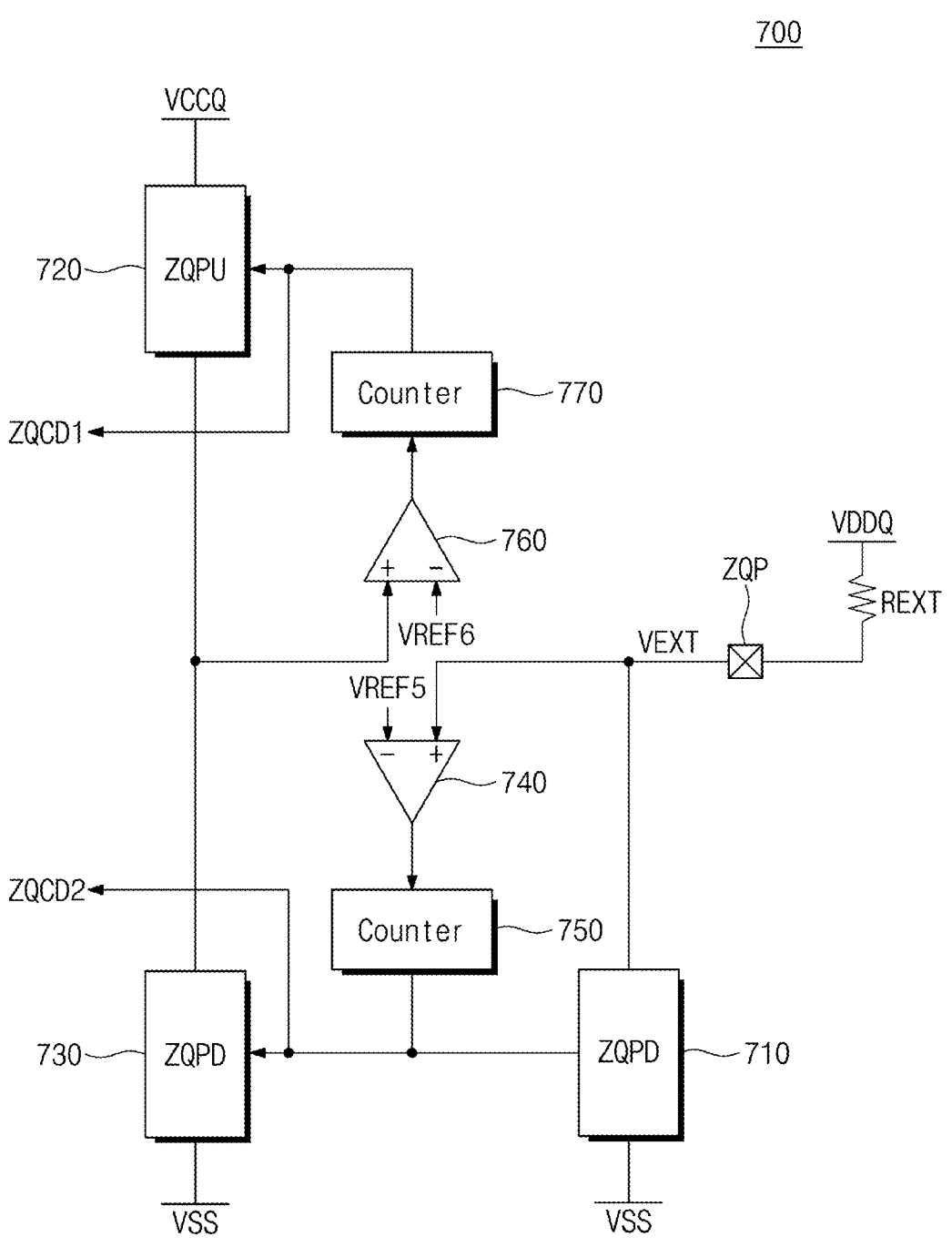
FIG. 10 illustrates a ZQ core according to another embodiment of the present disclosure.

FIG. 10 illustrates a ZQ core 700 according to another embodiment of the present disclosure. The ZQ core 700 may correspond to the ZQ core 640 of FIG. 9. Referring to FIGS. 8, 9, and 10, the ZQ core 700 may include a first pull-down ZQ circuit (ZQPD) 710, a pull-up ZQ circuit (ZQPU) 720, a second pull-down ZQ circuit (ZQPD) 730, a first comparator 740, a first counter 750, a second comparator 760, and a second counter 770.

The first pull-down ZQ circuit 710 may be connected between the ground node to which the ground voltage VSS is applied and the ZQ pad ZQP. That is, the external resistor REXT and the first pull-down ZQ circuit 710 may be connected in series between the power node to which the second power supply voltage VDDQ is applied and the ground node to which the ground voltage VSS is applied. The first pull-down ZQ circuit 710 may include a plurality of switches (e.g., transistors) which are connected in parallel between the ground node and the ZQ pad ZQP. The plurality of switches may be respectively turned on or turned off in response to bits of a count value transferred from the first counter 750.

The pull-up ZQ circuit 720 and the second pull-down ZQ circuit 730 may be connected in series between the power node to which the first power supply voltage VCCQ is applied and the ground node to which the ground voltage VSS is applied. The pull-up ZQ circuit 720 may include a plurality of switches (e.g., transistors) which are connected in parallel. The plurality of switches of the pull-up ZQ circuit 720 may be respectively turned on or turned off in response to bits of a count value transferred from the second counter 770. The second pull-down ZQ circuit 730 may include a plurality of switches (e.g., transistors) which are connected in parallel. The plurality of switches of the second pull-down ZQ circuit 730 may be respectively turned on or turned off in response to the bits of the count value transferred from the first counter 750.

The first comparator 740 may compare a fifth reference voltage VREF5 and the external voltage VEXT. When the external voltage VEXT is higher than (or higher than or equal to) the fifth reference voltage VREF5, the first comparator 740 may output a signal of the high level; when the external voltage VEXT is lower than (or lower than or equal to) the fifth reference voltage VREF5, the first comparator 340 may output a signal of the low level.

The first counter 750 may operate in response to an output voltage of the first comparator 740. For example, the first counter 750 may perform the counting operation when the output voltage of the first comparator 740 is at the high level (or the low level). The first counter 750 may stop the counting operation when the output voltage of the first comparator 740 is at the low level (or the high level).

As the count (or count value) of the first counter 750 increases, the switches of each of the first pull-down ZQ circuit 710 and the second pull-down ZQ circuit 730 may be sequentially turned on (or turned off). As the count value increases until the output voltage of the first comparator 740 transitions (or is flipped), the first counter 750 may increase the number of switches turned on (or turned off) from among the switches of each of the first pull-down ZQ circuit 710 and the second pull-down ZQ circuit 730 until the output voltage of the first comparator 740 transitions.

That is, the first counter 750 may gradually increase (or decrease) the capability by which each of the first pull-down ZQ circuit 710 and the second pull-down ZQ circuit 730 transfers the ground voltage VSS, that is, may adjust the driving capability of each of the first pull-down ZQ circuit 710 and the second pull-down ZQ circuit 730. The level of the fifth reference voltage VREF5 may be defined such that the driving capability of each of the first pull-down ZQ circuit 710 and the second pull-down ZQ circuit 730 is optimized. In an embodiment, the level of the fifth reference voltage VREF5 may be set to half the second power supply voltage VDDQ or a level similar thereto.

Bits of the count value which are generated at a point in time when the output voltage of the first comparator 740 transitions or flips (or immediately before a point in time when the output voltage of the first comparator 740 transitions or flips) may be the first ZQ codes ZQCD1. As a portion of the ZQ codes ZQCD, the first ZQ codes ZQCD1 may be transferred to the first data signal driver and receiver 611, the second data signal driver and receiver 612, the third data signal driver and receiver 613, and the fourth data signal driver and receiver 614.

The second comparator 760 may compare a sixth reference voltage VREF6 with a voltage of a node between the pull-up ZQ circuit 720 and the second pull-down ZQ circuit 730. When the voltage of the node between the pull-up ZQ circuit 720 and the second pull-down ZQ circuit 730 is higher than (or higher than or equal to) the sixth reference voltage VREF6, the second comparator 760 may output a signal of the high level; when the voltage of the node between the pull-up ZQ circuit 720 and the second pull-down ZQ circuit 730 is lower than (or lower than or equal to) the sixth reference voltage VREF6, the second comparator 760 may output a signal of the low level.

The second counter 770 may operate in response to an output voltage of the second comparator 760. For example, the second counter 770 may perform the counting operation when the output voltage of the second comparator 760 is at the high level (or the low level). The second counter 770 may stop the counting operation when the output voltage of the second comparator 760 is at the low level (or the high level).

As the count (or count value) of the second counter 770 increases, the switches of the pull-up ZQ circuit 720 may be sequentially turned on (or turned off). As the count value increases until the output voltage of the second comparator 760 transitions or flips, the second counter 770 may increase the number of switches turned on (or turned off) from among the switches of the pull-up ZQ circuit 720 until the output voltage of the second comparator 760 transitions.

That is, the second counter 770 may gradually increase (or decrease) the capability by which the pull-up ZQ circuit 720 transfers the first power supply voltage VCCQ, that is, may adjust the driving capability of the pull-up ZQ circuit 720. The level of the sixth reference voltage VREF6 may be defined such that the driving capability of the pull-up ZQ circuit 720 is optimized. In an embodiment, the level of the sixth reference voltage VREF6 may be set to half the second power supply voltage VDDQ or a level similar thereto.

Bits of the count value which is generated at a point in time when the output voltage of the second comparator 760 transitions or flips (or immediately before a point in time when the output voltage of the second comparator 760 transitions or flips) may be the second ZQ codes ZQCD2. As a portion of the ZQ codes ZQCD, the second ZQ codes ZQCD2 may be transferred to the first data signal driver and receiver 611, the second data signal driver and receiver 612, the third data signal driver and receiver 613, and the fourth data signal driver and receiver 614.

In an embodiment, configurations and operations of the first data signal driver and receiver 611, the second data signal driver and receiver 612, the third data signal driver and receiver 613, and the fourth data signal driver and receiver 614 may be the same as those of the data signal driver and receiver 400 described with reference to FIG. 7. Thus, additional description will be omitted.

Figure 11:
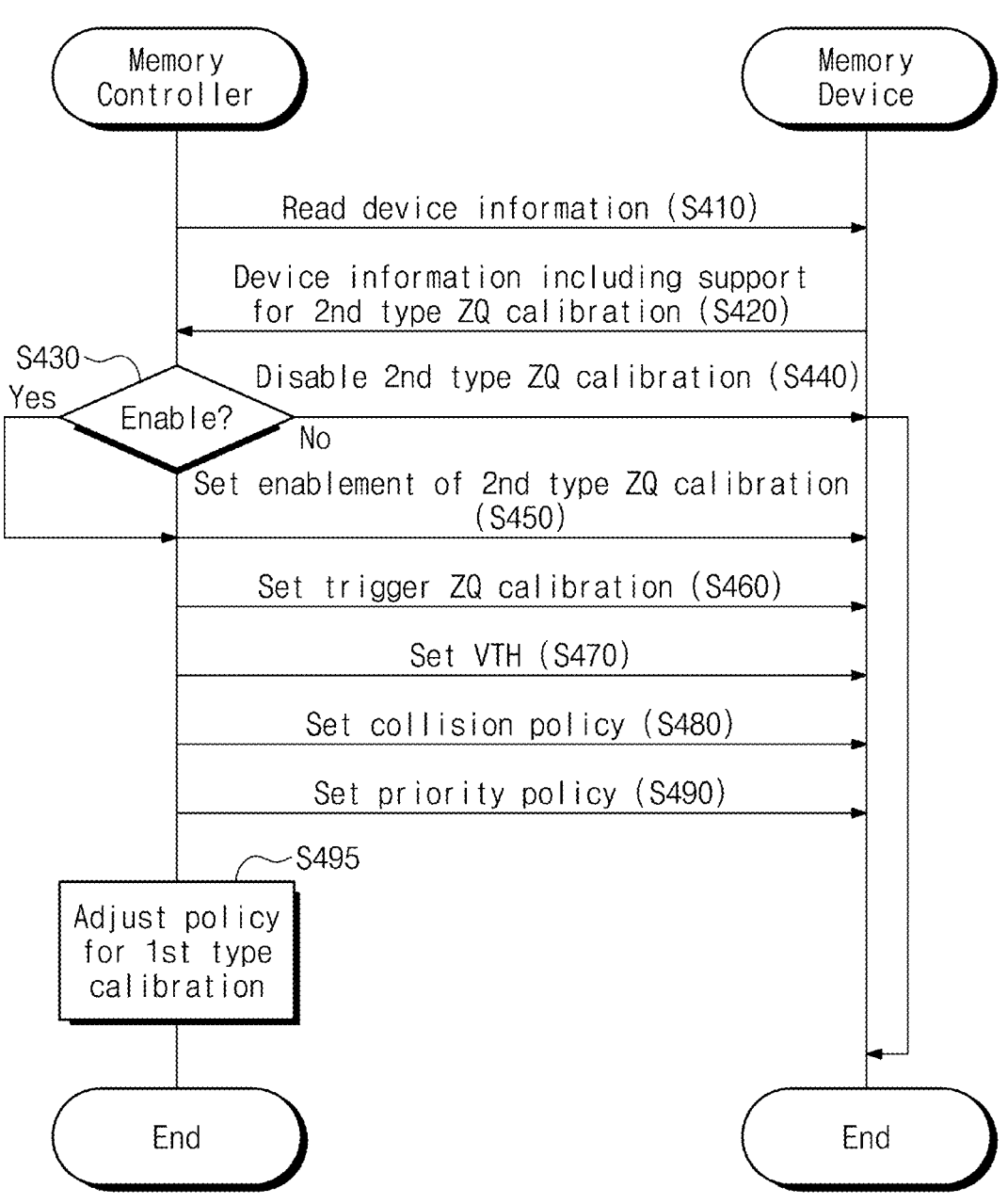
FIG. 11 illustrates an operating method of a memory system according to an embodiment of the present disclosure.

FIG. 11 illustrates an operating method of the memory system 100 or 500 according to an embodiment of the present disclosure. Referring to FIGS. 1, 8, and 11, in operation S410, the memory controller 120 or 520 may read device information of the memory device 110*a*, 110*b*, 510*a*, or 510*b*. For example, the memory controller 120 or 520 may transmit a command for reading the device information to the memory device 110*a*, 110*b*, 510*a*, or 510*b*.

In operation S420, the memory device 110*a*, 110*b*, 510*a*, or 510*b* may provide the memory controller 120 or 520 with the device information including a support for the second-type ZQ calibration. For example, in response to the command for reading the device information, which is transmitted from the memory controller 120 or 520, the memory device 110*a*, 110*b*, 510*a*, or 510*b* may provide the memory controller 120 or 520 with the device information including support information indicating whether to support the second-type ZQ calibration.

In an embodiment, it is assumed that the memory device 110*a*, 110*b*, 510*a*, or 510*b* supports the second-type ZQ calibration. The memory device 110*a*, 110*b*, 510*a*, or 510*b* may provide the memory controller 120 or 520 with the device information including the support information indicating that the second-type ZQ calibration is supported.

Based on the support information included in the device information, the memory controller 120 or 520 may determine whether the memory device 110*a*, 110*b*, 510*a*, or 510*b* supports the second-type ZQ calibration. When it is determined that the memory device 110*a*, 110*b*, 510*a*, or 510*b* supports the second-type ZQ calibration, in operation S430, the memory controller 120 or 520 may determine whether to enable the second-type ZQ calibration.

For example, the memory controller 120 or 520 may determine whether to enable the second-type ZQ calibration, based on settings of an external host device. When the disablement of the second-type ZQ calibration is determined, in operation S440, the memory controller 120 or 520 may disable the second-type ZQ calibration. For example, the memory controller 120 or 520 may disable the second-type ZQ calibration by transmitting a request for disabling the second-type ZQ calibration to the memory device 110*a*, 110*b*, 510*a*, or 510*b*. Afterwards, the memory controller 120 or 520 may terminate the process associated with the second-type ZQ calibration.

When the enablement of the second-type ZQ calibration is determined, in operation S450 to operation S495, the memory controller 120 or 520 may set options associated with the second-type ZQ calibration.

In operation S450, the memory controller 120 or 520 may set the enablement of the second-type ZQ calibration. For example, the memory controller 120 or 520 may enable the second-type ZQ calibration by transmitting a request for enabling the second-type ZQ calibration to the memory device 110*a*, 110*b*, 510*a*, or 510*b*.

In operation S460, the memory controller 120 or 520 may set a trigger condition. For example, the memory controller 120 or 520 may set whether to use one of the following conditions as a condition for triggering the second-type ZQ calibration: the number of times that a specific command (e.g., at least one of write, read, erase, precharge, and refresh commands) is received, a time length, and a length of a time during which the memory device 110*a*, 110*b*, 510*a*, or 510*b* is exposed to an environment whose temperature is higher than a threshold temperature. For example, the memory controller 120 or 520 may set the trigger condition by transmitting a request for setting the trigger condition to the memory device 110*a*, 110*b*, 510*a*, or 510*b*.

In operation S470, the memory controller 120 or 520 may set the threshold value VTH. For example, the memory controller 120 or 520 may set the threshold value VTH to be compared with a count value. For example, the memory controller 120 or 520 may set the threshold value VTH by transmitting a request for setting the threshold value VTH to the memory device 110*a*, 110*b*, 510*a*, or 510*b*.

In operation S480, the memory controller 120 or 520 may set a collision policy. For example, the memory controller 120 or 520 may set whether to use one of the following policies as a collision policy: a policy of determining whether to wait until a specific command (e.g., at least one of write, read, erase, precharge, and refresh commands) is received next after the collision is made and a policy of determining whether to wait as much as a given time. For example, the memory controller 120 or 520 may set the collision policy by transmitting a request for setting the collision policy to the memory device 110*a*, 110*b*, 510*a*, or 510*b*.

In operation S490, the memory controller 120 or 520 may set a priority policy. For example, when the memory controller 120 or 520 transmits any other command to the memory device 110*a*, 110*b*, 510*a*, or 510*b* while the second-type ZQ calibration is pending, based on the collision policy, the memory controller 120 or 520 may set whether to allow the memory device 110*a*, 110*b*, 510*a*, or 510*b* to first perform the pending second-type ZQ calibration or to first perform any other command received from the memory controller 120 or 520.

For example, the memory controller 120 or 520 may set the priority policy by transmitting a request for setting the priority policy to the memory device 110*a*, 110*b*, 510*a*, or 510*b*.

In an embodiment, the settings in operation S450 to operation S490 associated with the memory device 110*a* or 510*a* may be different from the settings in operation S450 to operation S490 associated with the memory device 110*b* or 510*b*. For example, the memory controller 120 or 520 may enable the second-type ZQ calibration of one memory device and may disable the second-type ZQ calibration of the other memory device. The memory controller 120 or 520 may differently set the trigger conditions of the memory device 110*a* and 110*b* or 510*a* and 510*b*. The memory controller 120 or 520 may differently set the threshold values VTH of the memory device 110*a* and 110*b* or 510*a* and 510*b*.

The memory controller 120 or 520 may differently set the trigger conditions of the memory device 110*a* and 110*b* or 510*a* and 510*b*. For example, the memory controller 120 or 520 may differently set times during which the memory device 110*a* and 110*b* or 510*a* and 510*b* wait when the collision is made. The memory controller 120 or 520 may differently set the priority policies of the memory device 110*a* and 110*b* or 510*a* and 510*b*.

In operation S495, the memory controller 120 or 520 may adjust a policy of the first-type ZQ calibration. For example, the memory controller 120 or 520 may adjust a policy of requesting the memory device 110*a* and 110*b* or 510*a* and 510*b* to perform the first-type ZQ calibration.

For example, the memory controller 120 or 520 may alleviate conditions of requesting the memory device 110*a* and 110*b* or 510*a* and 510*b* to perform the first-type ZQ calibration. When the memory controller 120 or 520 requests the first-type ZQ calibration based on a time period, the memory controller 120 or 520 may increase the time period. When the memory controller 120 or 520 requests the first-type ZQ calibration based on the number of times of a specific command, the memory controller 120 or 520 may increase the number of times. When the memory controller 120 or 520 requests the first-type ZQ calibration when a temperature is high, the memory controller 120 or 520 may make a criterion of the temperature higher. When the memory controller 120 or 520 requests the first-type ZQ calibration based on a time during which the memory device 110a and 110b or 510a and 510b is exposed to a high temperature, the memory controller 120 or 520 may make the criterion of the temperature higher or may make a criterion of a time higher.

For example, the memory controller 120 or 520 may adjust a first-type ZQ calibration policy only associated with a memory device, in which the second-type ZQ calibration is enabled, from among the memory device 110a and 110b or 510a and 510b. In an embodiment, the memory controller 120 or 520 may differently adjust first-type ZQ calibration policies of the memory device 110a and 110b or 510a and 510b.

In an embodiment, the setting operations described with reference to operation S450 to operation S490 may be simultaneously performed based on one command. The settings described with reference to operation S450 to operation S490 may be performed based on two or more commands or may be performed based on different commands.

Figure 12:
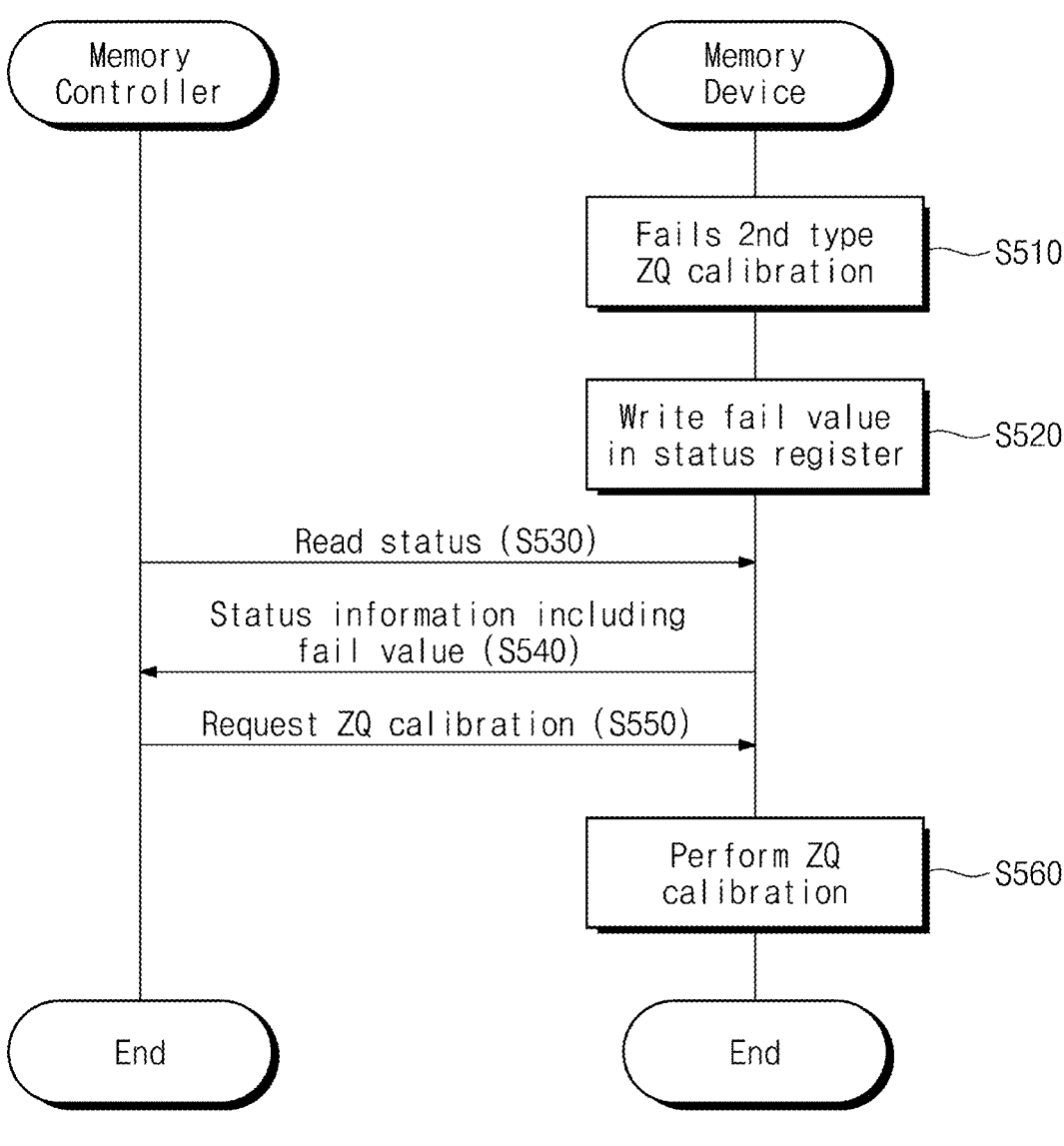
FIG. 12 illustrates an example of a procedure which is performed when second-type ZQ calibration fails.

FIG. 12 illustrates an example of a procedure which is performed when second-type ZQ calibration fails. Referring to FIGS. 1, 8, and 12, in operation S510, the memory device 110a, 110b, 510a, or 510b may fail in the second-type ZQ calibration. In response to the second-type ZQ calibration failing, in operation S520, the memory device 110a, 110b, 510a, or 510b may write a fail value in a status register. The fail value may be a value defined in the process of manufacturing the memory device 110a, 110b, 510a, or 510b.

In operation S530, the memory controller 120 or 520 may read status of the memory device 110a, 110b, 510a, or 510b. For example, the memory controller 120 or 520 may transmit the status read command to the memory device 110a, 110b, 510a, or 510b periodically, after a specific command is transmitted to the memory device 110a, 110b, 510a, or 510b, or when an abnormal operation occurs.

In response to the status read command, in operation S540, the memory device 110a, 110b, 510a, or 510b may transmit status information including the fail value to the memory controller 120 or 520. Based on the status information including the fail value, the memory controller 120 or 520 may identify that the ZQ calibration (e.g., the first-type ZQ calibration or the second-type ZQ calibration) of the memory device 110a, 110b, 510a, or 510b fails.

In response to the ZQ calibration failing, in operation S550, the memory controller 120 or 520 may request the ZQ calibration from the memory device 110a, 110b, 510a, or 510b. For example, the memory controller 120 or 520 may request the first-type ZQ calibration from the memory device 110a, 110b, 510a, or 510b.

In operation S560, the memory device 110a, 110b, 510a, or 510b may perform the first-type ZQ calibration. Afterwards, as the follow-up procedure of the first-type ZQ calibration, the memory controller 120 or 520 may again read status of the memory device 110a, 110b, 510a, or 510b.

Figure 13:
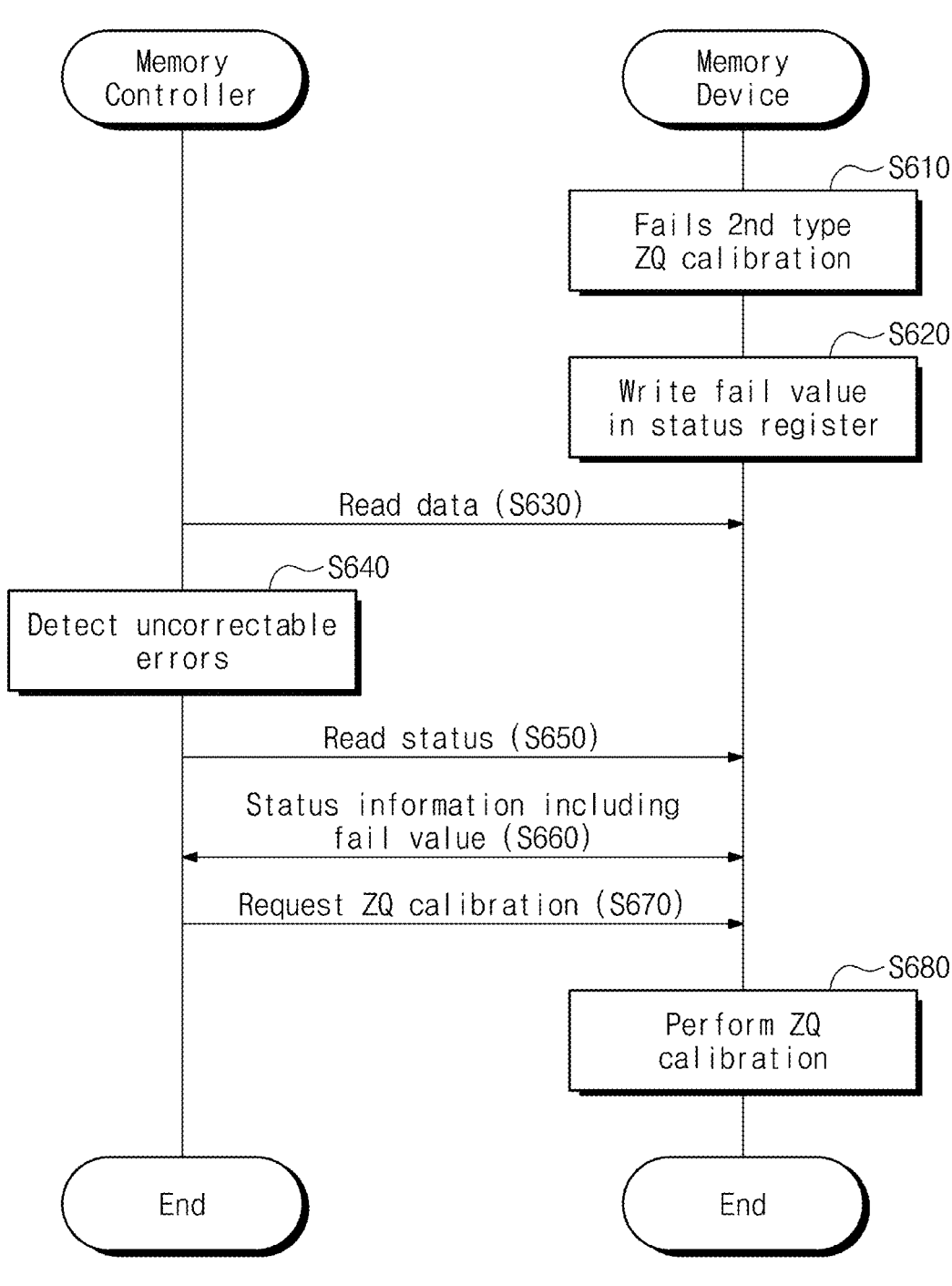
FIG. 13 illustrates another example of a procedure which is performed when second-type ZQ calibration fails.

FIG. 13 illustrates another example of a procedure which is performed when second-type ZQ calibration fails. Referring to FIGS. 1, 8, and 13, in operation S610, the memory device 110a, 110b, 510a, or 510b may fail in the second-type ZQ calibration. In response to the second-type ZQ calibration failing, in operation S620, the memory device 110a, 110b, 510a, or 510b may write a fail value in a status register. The fail value may be a value defined in the process of manufacturing the memory device 110a, 110b, 510a, or 510b.

In operation S630, the memory controller 120 or 520 may read data from the memory device 110a, 110b, 510a, or 510b. Because the ZQ calibration of the memory device 110a, 110b, 510a, or 510b fails, the data read from the memory device 110a, 110b, 510a, or 510b may include errors. In operation S640, the memory controller 120 or 520 may detect uncorrectable errors from the read data.

When the uncorrectable error is detected, in operation S650, the memory controller 120 or 520 may read status of the memory device 110a, 110b, 510a, or 510b. In response to the status read command, in operation S660, the memory device 110a, 110b, 510a, or 510b may transmit status information including the fail value to the memory controller 120 or 520. Based on the status information including the fail value, the memory controller 120 or 520 may identify that the ZQ calibration (e.g., the first-type ZQ calibration or the second-type ZQ calibration) of the memory device 110a, 110b, 510a, or 510b fails.

In response to the ZQ calibration failing, in operation S670, the memory controller 120 or 520 may request the ZQ calibration from the memory device 110a, 110b, 510a, or 510b. For example, the memory controller 120 or 520 may request the first-type ZQ calibration from the memory device 110a, 110b, 510a, or 510b.

In operation S680, the memory device 110a, 110b, 510a, or 510b may perform the first-type ZQ calibration. Afterwards, as the follow-up procedure of the first-type ZQ calibration, the memory controller 120 or 520 may again read status information of the memory device 110a, 110b, 510a, or 510b.

Figure 14:
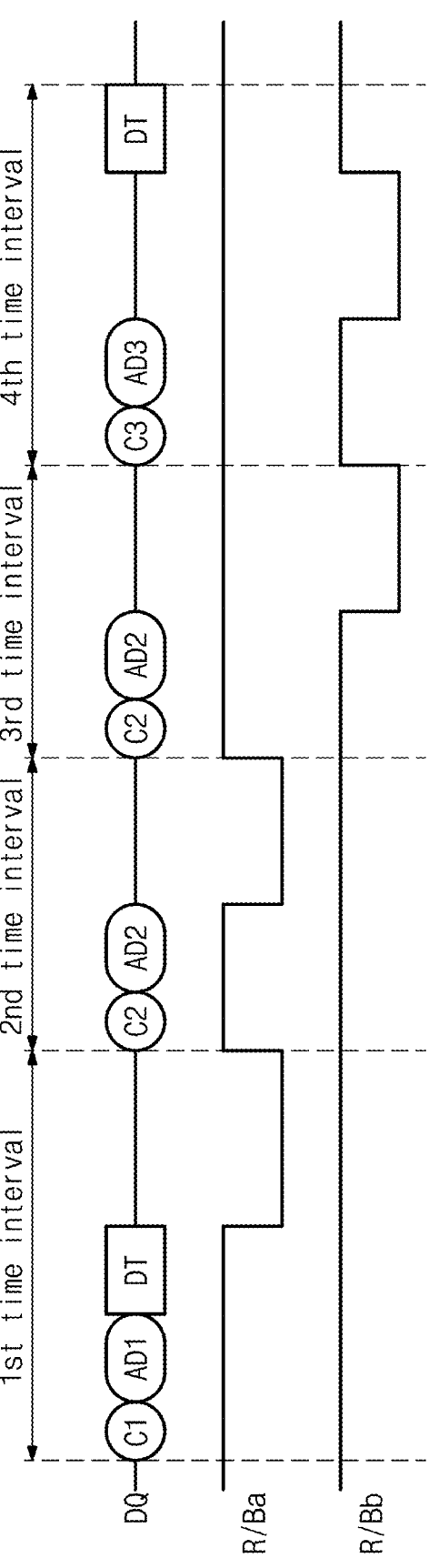
FIG. 14 illustrates an example in which a memory system performs first-type ZQ calibration.

FIG. 14 illustrates an example in which the memory system 100 performs first-type ZQ calibration. Referring to FIGS. 1 and 14, in a first time interval, the memory controller 120 may transmit a first command C1, a first address AD1, and data DT to the first memory device 110a as the data signals DQ. The first command C1 may be the write command. The first memory device 110a may allow a first ready/busy signal R/Ba to transition to the low level indicating the busy state and may perform the write operation of the data DT. After the write operation is completed, the first memory device 110a may allow the first ready/busy signal R/Ba to transition to the high level indicating the ready state. The first ready/busy signal R/Ba may be included in the second control signals CT2.

In a second time interval, the memory controller 120 may transmit a second command C2 and a second address AD2 to the first memory device 110a as the data signals DQ. The second command C2 may be a command for requesting the first-type ZQ calibration. The first memory device 110a may allow the first ready/busy signal R/Ba to transition to the low level indicating the busy state and may perform the first-type ZQ calibration. After the first-type ZQ calibration is completed, the first memory device 110a may allow the first ready/busy signal R/Ba to transition to the high level indicating the ready state.

In a third time interval, the memory controller 120 may transmit the second command C2 and the second address AD2 to the second memory device 110b as the data signals DQ. The second command C2 may be a command for requesting the first-type ZQ calibration. The second memory device 110b may allow a second ready/busy signal R/Bb to transition to the low level indicating the busy state and may perform the first-type ZQ calibration. After the first-type ZQ calibration is completed, the second memory device 110*b* may allow the second ready/busy signal R/Bb to transition to the high level indicating the ready state. The second ready/busy signal R/Bb may be included in the second control signals CT2.

In a fourth time interval, the memory controller 120 may transmit a third command C3 and a third address AD3 to the second memory device 110*b* as the data signals DQ. The third command C3 may be the read command. The second memory device 110*b* may allow the second ready/busy signal R/Bb to transition to the low level indicating the busy state and may perform the read operation of the data DT. After the read operation is completed, the second memory device 110*b* may allow the second ready/busy signal R/Bb to transition to the high level indicating the ready state. Afterwards, the second memory device 110*b* may transmit the data DT to the memory controller 120 as the data signals DQ.

Figure 15:
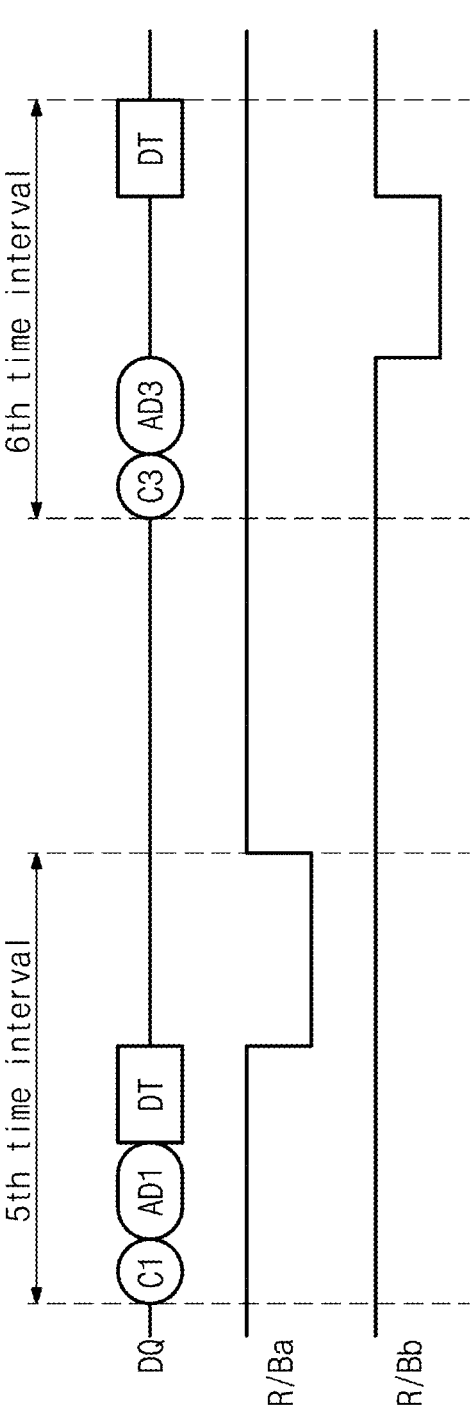
FIG. 15 illustrates an example in which a memory system performs second-type ZQ calibration.

FIG. 15 illustrates an example in which the memory system 100 performs second-type ZQ calibration. Referring to FIGS. 1 and 15, in a fifth time interval, the memory controller 120 may transmit the first command C1, the first address AD1, and the data DT to the first memory device 110*a* as the data signals DQ. The first command C1 may be the write command. The first memory device 110*a* may allow the first ready/busy signal R/Ba to transition to the low level indicating the busy state and may perform the write operation of the data DT.

The first memory device 110*a* may perform the second-type ZQ calibration before the write operation is completed. When the second-type ZQ calibration is completed, the first memory device 110*a* may complete the write operation. After the write operation is completed, the first memory device 110*a* may allow the first ready/busy signal R/Ba to transition to the high level indicating the ready state.

In a sixth time interval, the memory controller 120 may transmit the third command C3 and the third address AD3 to the second memory device 110*b* as the data signals DQ. The third command C3 may be the read command. The second memory device 110*b* may allow the second ready/busy signal R/Bb to transition to the low level indicating the busy state and may perform the read operation of the data DT.

The second memory device 110*b* may perform the second-type ZQ calibration before the read operation is completed. When the second-type ZQ calibration is completed, the second memory device 110*b* may complete the read operation. After the read operation is completed, the second memory device 110*b* may allow the second ready/busy signal R/Bb to transition to the high level indicating the ready state. Afterwards, the second memory device 110*b* may transmit the data DT to the memory controller 120 as the data signals DQ.

Referring to FIGS. 14 and 15, the second-type ZQ calibration may be performed more quickly than the first-type ZQ calibration as much as a time taken to transmit a command and an address. Also, operations, which are associated with the first-type ZQ calibration, such as a status read operation and operations of enabling and disabling the on-die termination may be omitted in the second-type ZQ calibration. Accordingly, it is possible to improve an operating speed while improving the reliability of the memory system 100 through the ZQ calibration. Likewise, the reliability and the operating speed of the memory system 500 may also be improved. For example, the second ZQ calibration, without the command from the memory controller, reduces control overhead for the memory controller and improves calibration because the calibration is performed more frequently.

Figure 16:
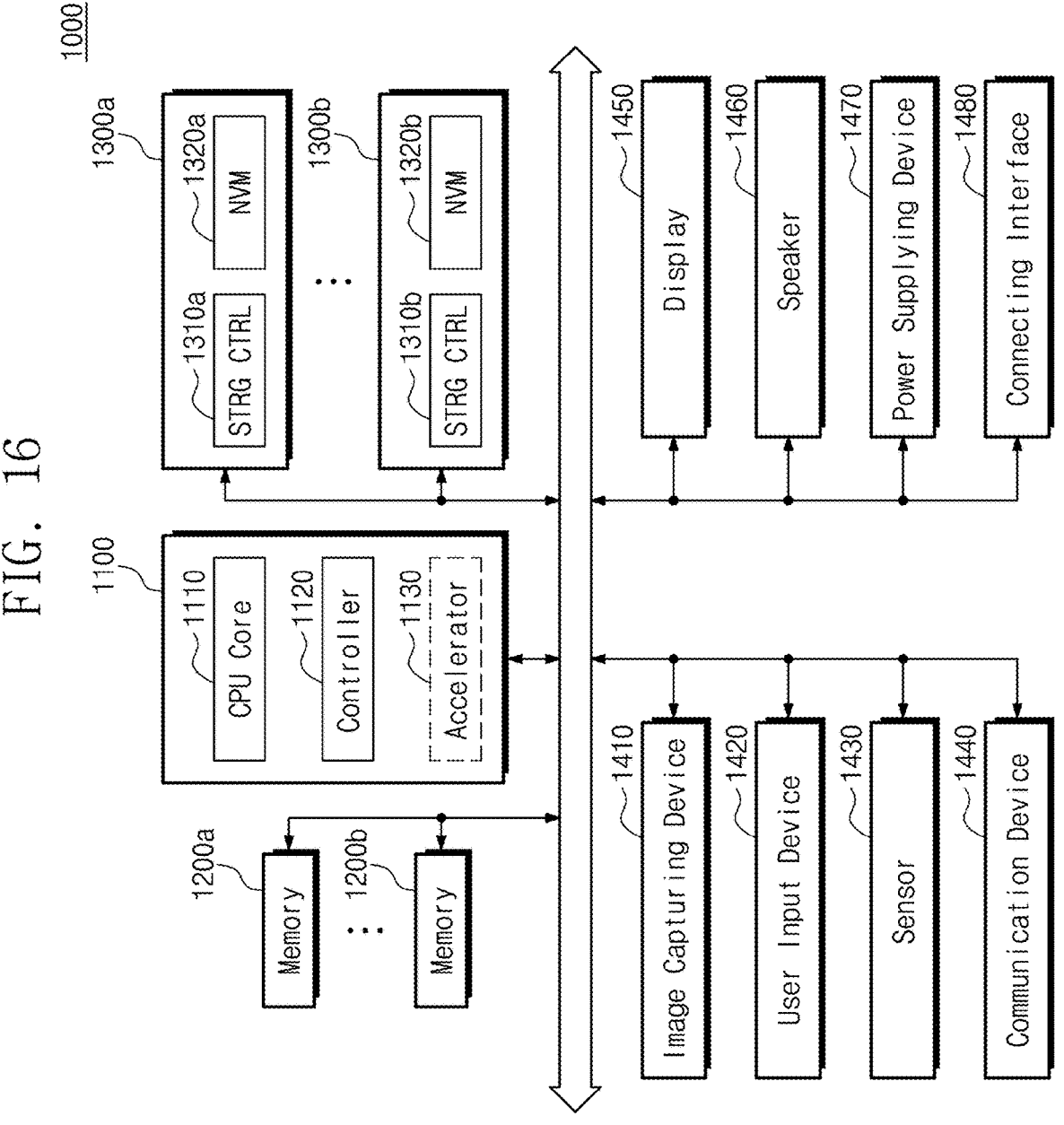
FIG. 16 is a diagram illustrating a system according to an embodiment of the present disclosure.

FIG. 16 is a diagram of a system 1000 to which a storage device is applied, according to an embodiment. The system 1000 of FIG. 16 may be a mobile system, such as a portable communication terminal (e.g., a mobile phone), a smartphone, a tablet personal computer (PC), a wearable device, a healthcare device, or an Internet of things (IoT) device. However, the system 1000 of FIG. 16 is not necessarily limited to the mobile system and may be a PC, a laptop computer, a server, a media player, or an automotive device (e.g., a navigation device).

Referring to FIG. 16, the system 1000 may include a main processor 1100, memories (e.g., 1200*a* and 1200*b*), and storage devices (e.g., 1300*a* and 1300*b*). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, phase-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers (STRG CTRL) 1310*a* and 1310*b* and NVM (Non-Volatile Memory)s 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In an embodiment, the memory system 100 described with reference to FIGS. 1 to 15 may be implemented the storage devices 1300a and 1300b. Each of the storage devices 1300a and 1300b may include the first memory device 110a, the second memory device 110b, and the memory controller 120. The storage devices 1300a and 1300b may perform the first-type ZQ calibration depending on the request of the main processor 1100 and may perform the second-type ZQ calibration without the request of the main processor 1100.

The first memory device 510a and the second memory device 510b of the memory system 500 described with reference to FIGS. 1 to 15 may be implemented with the memory 1200a or 1200b. The memory controller 520 of the memory system 500 may be implemented with the controller 1120 of the main processor 1100. The memory 1200a or 1200b may perform the first-type ZQ calibration depending on the request of the controller 1120 and may perform the second-type ZQ calibration without the request of the controller 1120.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP). Examples of blocks may include ZQ commander 280, collision preventer 260, ZQ calibrator 511, command parser 630, ZQ Core 640 (also see FIG. 6), pulse generator 690, and voltage generator 661.

According to embodiments of the present disclosure, a memory device may perform ZQ calibration depending on a request of a memory controller. In this case, the memory device may internally support the ZQ calibration which is performed within a shorter time even without the request of the memory controller. Accordingly, a memory device with improved operating speed and improved reliability, a memory system including the memory device, and an operating method of the memory device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory device comprising:
   data pads configured to be connected to an external memory controller;
   a ZQ pad configured to be connected to an external resistor;
   data drivers and receivers connected to the data pads, the data drivers and receivers being configured to output first data signals to the data pads or to receive second data signals from the data pads; and
   a ZQ calibrator connected to the ZQ pad, the ZQ calibrator being configured to perform ZQ calibration based on a voltage of the ZQ pad, generate ZQ codes as a result of the ZQ calibration, and provide the ZQ codes to the data drivers and receivers,
   wherein the ZQ calibrator is further configured to:
      perform a first-type ZQ calibration in response to a command received from the external memory controller; and
      perform a second-type ZQ calibration without the command being received from the external memory controller.

2. The memory device of claim 1, further comprising:
   a counter configured to count a number of times that a specific command is received; and
   a register configured to store a threshold value,
   wherein the ZQ calibrator is further configured to, based on a count value of the counter reaching the threshold value, perform the second-type ZQ calibration.

3. The memory device of claim 2, wherein the specific command comprises at least one of a read command, a write command, an erase command, a precharge command, and a refresh command.

4. The memory device of claim 2, wherein the ZQ calibrator is further configured to, based on the voltage of the ZQ pad being lower than a reference voltage at a point in time for which the count value of the counter reaches the threshold value, perform the second-type ZQ calibration.

5. The memory device of claim 2, wherein, based on an arbitrary command being received at a point in time for which the count value of the counter reaches the threshold value, an order of performing the arbitrary command first or performing the ZQ calibration first is selected based on a priority.

6. The memory device of claim 1, further comprising:
a counter configured to count a time value; and
a register configured to store a threshold value,
wherein the ZQ calibrator is further configured to, based on a count value of the counter reaching the threshold value, perform the second-type ZQ calibration.

7. The memory device of claim 6, wherein the ZQ calibrator is further configured to, based on the voltage of the ZQ pad being higher than a reference voltage and the time value of the counter reaching the threshold value, wait for a standby time before performing the second-type ZQ calibration.

8. The memory device of claim 1, further comprising:
a temperature sensor configured to sense a temperature;
a counter configured to count a time duration during which the temperature sensed by the temperature sensor is higher than a first threshold value; and
a register configured to store a second threshold value,
wherein the ZQ calibrator is further configured to, based on the time duration reaching the second threshold value, perform the second-type ZQ calibration.

9. The memory device of claim 1, wherein the command of the external memory controller is received through the data pads.

10. The memory device of claim 1, further comprising:
command and address pads,
wherein the command of the external memory controller is received through the command and address pads.

11. A memory system comprising:
a plurality of memory devices; and
a memory controller configured to control the plurality of memory devices,
wherein each of the plurality of memory devices is configured to:
perform a first-type ZQ calibration in response to a command received from the memory controller; and
perform a second-type ZQ calibration without the command being received the memory controller,
wherein each of the plurality of memory devices comprises drivers configured to transmit data signals to the memory controller, and
wherein each of the first-type ZQ calibration and the second-type ZQ calibration is configured to calibrate the drivers of each of the plurality of memory devices.

12. The memory system of claim 11, wherein each of the plurality of memory devices is further configured to provide the memory controller with information indicating whether to support the second-type ZQ calibration, and wherein the memory controller is further configured to enable or disable the second-type ZQ calibration of each of the plurality of memory devices.

13. The memory system of claim 12, wherein, according to a first policy, the memory controller is further configured to transmit the command requesting the first-type ZQ calibration to the plurality of memory devices based on the second-type ZQ calibration being enabled in each of the plurality of memory devices, and
wherein, according to a second policy, the memory controller is further configured to transmit the command requesting the first-type ZQ calibration to the plurality of memory devices based on the second-type ZQ calibration being disabled in each of the plurality of memory devices.

14. The memory system of claim 11, wherein the memory controller is further configured to set a trigger condition in which each of the plurality of memory devices triggers the second-type ZQ calibration.

15. The memory system of claim 14, wherein the trigger condition comprises at least one of:
a number of times that a specific command not associated with the first-type ZQ calibration is received:
a first lapse of a first given time; and
a second lapse of a second given time at a temperature lower or higher than a threshold value.

16. The memory system of claim 11, wherein the memory controller is further configured to set a collision policy for collision that two or more memory devices among the plurality of memory devices simultaneously perform the second-type ZQ calibration.

17. The memory system of claim 16, wherein the collision policy comprises at least one of:
a first collision policy that the second-type ZQ calibration is postponed and is then again tried after a specific command not associated with the first-type ZQ calibration is received; and
a second collision policy that the second-type ZQ calibration is postponed and is then again tried after a given time passes.

18. The memory system of claim 17, wherein the memory controller is further configured to differently set the given time for each of the plurality of memory devices.

19. The memory system of claim 17, wherein the memory controller is further configured to set priorities of re-attempt of i) the second-type ZQ calibration which is postponed, and ii) execution of a second command transferred from the memory controller after the second-type ZQ calibration is postponed, for each of the plurality of memory devices.

20. An operating method of a memory device, the operating method comprising:
receiving, at the memory device, a command from an external memory controller;
performing, at the memory device, a first-type ZQ calibration in response to the command; and
performing, at the memory device, a second-type ZQ calibration in response to an internally managed count reaching a threshold value and without receiving the command from the external memory controller,
wherein the first-type ZQ calibration and the second-type ZQ calibration are performed to calibrate drivers of the memory device, and the drivers are configured to transmit data signals to the external memory controller.

* * * * *